(12) United States Patent
Sugimoto

(10) Patent No.: US 11,373,312 B2
(45) Date of Patent: Jun. 28, 2022

(54) PROCESSING SYSTEM, PROCESSING APPARATUS, TERMINAL APPARATUS, PROCESSING METHOD, AND PROGRAM

(71) Applicant: CANON KABUSHIKI KAISHA, Tokyo (JP)

(72) Inventor: Takashi Sugimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 16/709,646

(22) Filed: Dec. 10, 2019

(65) Prior Publication Data

US 2020/0193601 A1 Jun. 18, 2020

(30) Foreign Application Priority Data

Dec. 14, 2018 (JP) .............................. JP2018-234569

(51) Int. Cl.
  *G06T 7/00* (2017.01)
  *G06F 3/04883* (2022.01)
  *G06F 3/04847* (2022.01)
  *G06F 3/0482* (2013.01)

(52) U.S. Cl.
  CPC .......... *G06T 7/0016* (2013.01); *G06F 3/0482* (2013.01); *G06F 3/04847* (2013.01); *G06F 3/04883* (2013.01)

(58) Field of Classification Search
  CPC ............... G06T 7/0016; G06F 3/04883; G06F 3/04847; G06F 3/0482; G06F 3/0488
  See application file for complete search history.

(56) References Cited

U.S. PATENT DOCUMENTS

2016/0128795 A1\* 5/2016 Kozu ..................... G16H 30/20
  715/771
2020/0179759 A1\* 6/2020 Kubota .............. A63B 24/0062

FOREIGN PATENT DOCUMENTS

JP 2017-162056 A 9/2017

OTHER PUBLICATIONS

"Guidelines for the Prevention and Management of Pressure Ulcers;" Japanese Society of Pressure Ulcers, Japanese Journal of Pressure Ulcers (Jpn J PU), 17 (4): 487 to 557, 2015.
"Guidebook for the Prevention and Treatment of Pressure Ulcers in a Home Care Setting;" Third Edition, published by Shorinsha, Inc., compliant with Guidelines for the Prevention and Management of Pressure Ulcers (Fourth Edition), edited by Japanese Society of Pressure Ulcers, ISBN-13 978-4796523615 25, p. 40.

\* cited by examiner

*Primary Examiner* — Jennifer N Welch
*Assistant Examiner* — Ashley M Fortino
(74) *Attorney, Agent, or Firm* — Canon U.S.A., Inc. IP Division

(57) ABSTRACT

An image capturing apparatus sets reference values for a plurality of evaluation indexes and captures images of affected regions for the evaluation indexes, based on user's operation. An image processing apparatus analyzes the captured images and determines the affected region(s) for the evaluation index(es) exceeding the associated reference value(s) set by the user. The image capturing apparatus causes a display unit to highlight the affected region(s) for the evaluation index(es) exceeding the associated reference value(s) and superposes (displays) the affected region(s) on the image of an affected region.

28 Claims, 13 Drawing Sheets

PROCESSING SYSTEM, PROCESSING APPARATUS, TERMINAL APPARATUS, PROCESSING METHOD, AND PROGRAM

BACKGROUND OF THE INVENTION

Field of the Invention

The aspect of the embodiments relates to a technology for assessing an affected region of a subject based on an image of the subject.

Description of the Related Art

In a state where a human or an animal is lying down, a contact part of the body with a floor (a floor including a mattress) gets compressed by the weight of the body.

When the same position continues, defective circulation occurs in the contact part of the body with the floor, with the result that the surrounding tissue necroses. This state where a tissue is necrosed is called a pressure ulcer, a pressure sore, or a bedsore.

As described in Japanese Society of Pressure Ulcers, Guidelines for the Prevention and Management of Pressure Ulcers, Japanese Journal of Pressure Ulcers (Jpn J PU), 17 (4): 487 to 557, 2015, for patients who have developed a pressure ulcer, pressure ulcer care, such as body pressure dispersion care and skin care, may be provided, and pressure ulcers may be periodically assessed and managed.

As a tool for assessment of pressure ulcers, as described in Guidebook for the Prevention and Treatment of Pressure Ulcers In a Home Care Setting, Third Edition, published by Shorinsha, Inc., compliant with Guidelines for the Prevention and Management of Pressure Ulcers (Fourth Edition), edited by Japanese Society of Pressure Ulcers, ISBN-13 978-4796523615, p 24-26, the pressure ulcer condition scale "DESIGN-R (registered trademark)" developed by Scientific Education Committee of the Japanese Society of Pressure Ulcers has been suggested.

"DESIGN-R (registered trademark)" is a tool for evaluating the healing process of a wound including a pressure ulcer. This name is taken from the initial characters of the following evaluation indexes. In other words, the name is taken from the initial characters of Depth, Exudate, Size, Inflammation/Infection, Granulation, and Necrotic tissue.

There are two types of "DESIGN-R (registered trademark)". One is used to perform severity classification for daily simple evaluation, and the other is used to perform progress evaluation to show the flow of the healing process in details. In "DESIGN-R (registered trademark)" for severity classification, six evaluation items each are classified into two, that is, mild and severe. A lower-case alphabetic character represents a mild condition, and an upper-case alphabetic character represents a severe condition.

By performing evaluation with "DESIGN-R (registered trademark)" for severity classification at the time of first treatment, a rough condition of a pressure ulcer can be understood. This tool provides items to be concerned, so a treatment strategy can be easily decided.

On the other hand, as "DESIGN-R (registered trademark)" for progress evaluation, "DESIGN-R (registered trademark)" that can be used to not only perform progress evaluation but also compare the severity among patients is also determined. R denotes rating (evaluation and score). Different weights are assigned to the evaluation indexes, the total score (0 to 66) of six items other than Depth represents the severity of a wound. After the start of treatment, a course of treatment can be objectively evaluated in details. Not only progress evaluation for an individual but also severity comparison among patients can also be performed.

As described in the above Guidebook for the Prevention and Treatment of Pressure Ulcers In a Home Care Setting, in scoring of "DESIGN-R (registered trademark)", it is recommended to score once a week to evaluate the healing process of a pressure ulcer and select appropriate care, and the condition of the pressure ulcer is, for example, periodically evaluated and managed.

Evaluation of "Size" in "DESIGN-R (registered trademark)" is to measure the longitudinal diameter and transverse diameter (maximum diameter perpendicular to the longitudinal diameter) of a skin lesion region (in cm) and to classify the size into seven stages based on a numeric value obtained by the product of the longitudinal diameter and the transverse diameter. The seven stages include s0: no skin lesion, s3: less than four, s6: greater than or equal to four and less than 16, s8: greater than or equal to 16 and less than 36, s9: greater than or equal to 36 and less than 64, s12: greater than or equal to 64 and less than 100, and S15: greater than or equal to 100.

Evaluation of "Depth" is to classify the depth into seven stages based on the depth of a deepest part in a wound. The seven stages include d0: no skin lesion or redness, d1: persistent redness, d2: lesion extends to dermis, D3: lesion extends to hypodermis, D4: lesion extends beyond hypodermis, D5: lesion extends to articular or body cavity, and U: depth indeterminable.

Evaluation of "Inflammation/Infection" is to classify an inflammation/infection into four stages based on redness around a wound or infection of a wound itself. The four stages include i0: no sign of localized inflammation, i1: a sign of localized inflammation (redness, swelling, heat, pain and itch around a wound), I3: an apparent sign of localized infection (a sign of inflammation, pus, bad smell, or the like), and I9: progressive influence (fever, or the like).

Evaluation of "Granulation" is to classify the granulation into six stages based on the amount of granulation on a wound surface. The six stages include g0: formation of granulation cannot be assessed because the wound is healed or shallow, g1: good granulation occupies greater than or equal to 90% of a wound surface, and g3: good granulation occupies greater than or equal to 50% and less than 90% of a wound surface. The six stages also include G4: good granulation occupies greater than or equal to 10% and less than 50% of a wound surface, G5: good granulation occupies less than 10% of a wound surface, and G6: no good granulation is formed at all.

In progress evaluation (diagnosis) of a pressure ulcer, the evaluation value of each evaluation index is compared with the above-described criterion.

As described in the above Guidebook for the Prevention and Treatment of Pressure Ulcers In a Home Care Setting, the rate of exacerbation of a pressure ulcer varies depending on the degree of deterioration of a patient, the wetness of skin, and the like. For example, when measures are intended to be taken by early finding a pressure ulcer even with a mild symptom for a patient whose rate of exacerbation of a pressure ulcer is high, it is presumable that different criteria are sought for each patient.

As a technology for evaluating an image, Japanese Patent Laid-Open No. 2017-162056 describes a technology for calculating an evaluation value of an image to be evaluated, based on learning data and scores calculated for segmented regions of the image. The learning data is data that associates scores of a plurality of evaluation items of an image with an evaluation value that indicates a degree to which the image matches user's preference.

With the technology described in Japanese Patent Laid-Open No. 2017-162056, an image is evaluated by calculating scores of a plurality of evaluation items for image for each of the plurality of segmented regions; however, where the evaluated regions are cannot be visually checked. In addition, at the time of evaluating an image, a user is not allowed to change evaluation criteria, so this technology cannot handle the case where different criteria are sought for each patient like the above-described case.

SUMMARY OF THE INVENTION

A system according to an aspect of the embodiments includes an extracting unit configured to extract affected regions respectively for a plurality of evaluation indexes of an affected area from an image of a subject, a selecting unit configured to, based on evaluated results of the extracted affected regions respectively for the evaluation indexes, select the affected region for at least one of the evaluation indexes from among the affected regions respectively for the evaluation indexes, and a display control unit configured to causes a display unit to display information about the selected affected region for the at least one of the evaluation indexes. The information about the selected affected region for the at least one of the evaluation indexes is displayed in a mode different from a mode in which the information about the affected region for another of the evaluation indexes.

Further features of the disclosure will become apparent from the following description of exemplary embodiments with reference to the attached drawings.

DESCRIPTION OF THE EMBODIMENTS

Hereinafter, embodiments will be described with reference to the attached drawings.

First Embodiment

Initially, a first embodiment will be described.

Figure 1:
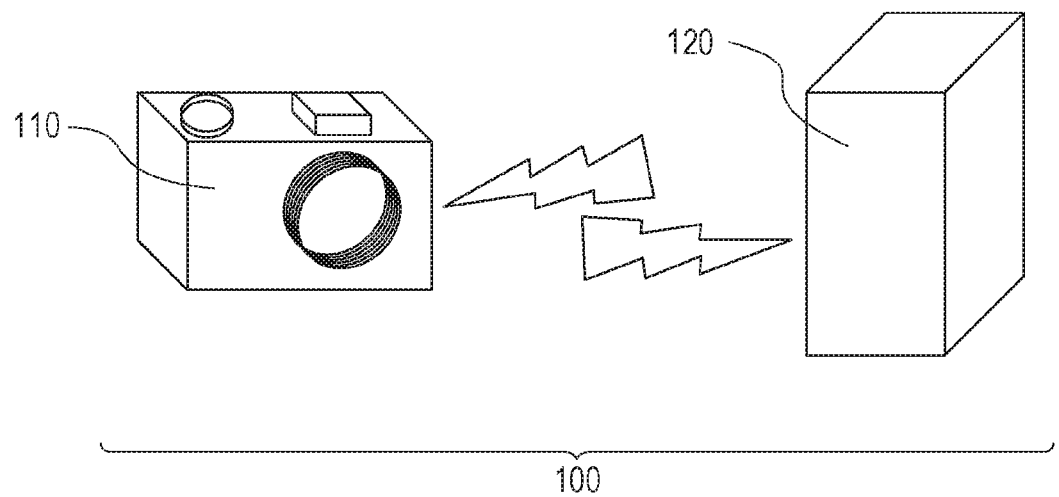
FIG. 1 is a diagram that shows a first example of the configuration of an image processing system.
Figure 2:
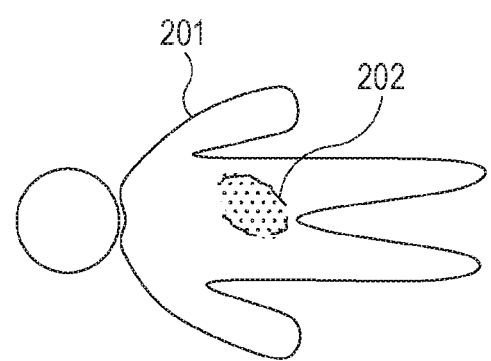
FIG. 2 is a diagram that shows a first example of a subject.

First, an example of an image processing system will be described with reference to FIG. 1 to FIG. 3. FIG. 1 is a diagram that shows an example of the configuration of the image processing system.

The image processing system 100 includes an image capturing apparatus 110 and an image processing apparatus 120. FIG. 2 is a diagram that shows an example of a subject to be measured by the image processing system 100. In the present embodiment, description will be made on the assumption that an example of a medical condition of an affected region 202, which has developed at the buttocks of the subject 201 is a pressure ulcer.

The image processing system 100 captures the image of the affected region 202 of the subject 201 to acquire a subject distance. Subsequently, the image processing system 100 extracts or segments affected regions 202 respectively for a plurality of evaluation indexes of an affected area from the image of the affected region 202. After that, the image processing system 100 calculates evaluation values respectively for the evaluation indexes based on the subject distance and the associated segmented results of the affected regions respectively for the evaluation indexes. Then, the image processing system 100 compares those evaluation values with associated reference values set prior to image capturing by a user. The image processing system 100 determines the affected region(s) to be highlighted, based on the results of the comparison. A target affected area is not limited to pressure ulcer and may be burns, laceration, or the like. In addition, a target to be measured is not limited to an affected area and may be an object contained in an image in electronic data.

Figure 3:
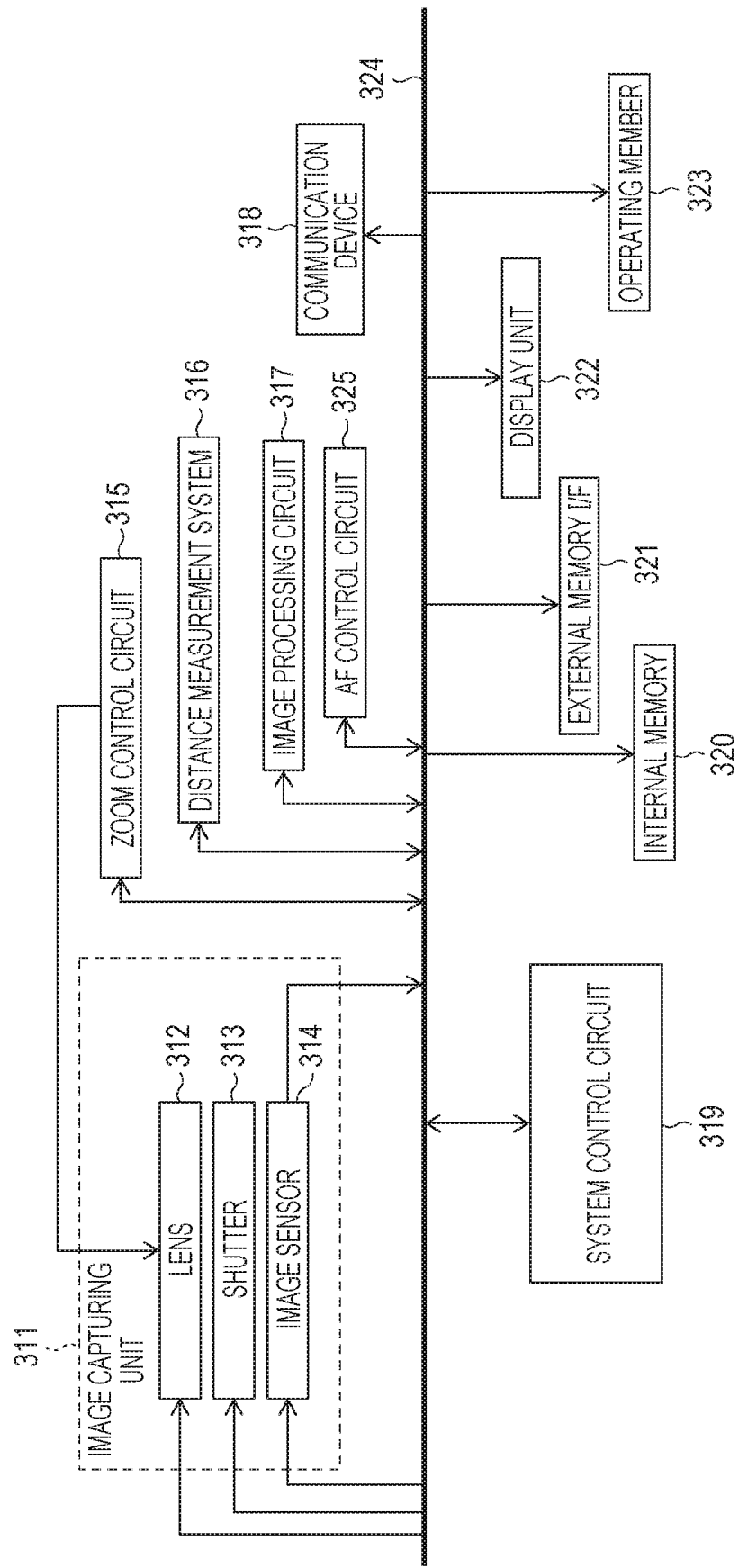
FIG. 3 is a diagram that shows the hardware configuration of an image capturing apparatus.

FIG. 3 shows an example of the hardware configuration of the image capturing apparatus 110 of FIG. 1.

The image capturing apparatus 110 includes an AF control circuit 325, an image capturing unit 311, a zoom control circuit 315, a distance measurement system 316, an image processing circuit 317, a communication device 318, and a system control circuit 319. The image capturing apparatus 110 further includes an internal memory 320, an external memory I/F 321, a display unit 322, an operating member 323, and a common bus 324.

The AF control circuit 325 controls a focus lens by extracting a high-frequency component of an image signal (video signal) of a designated area and searching for a position of the focus lens at which the high-frequency component is maximal, and automatically adjusts a focal point. The focus lens is included in the lens 312. This focus control system is also referred to as TV-AF or contrast AF and has the characteristics of providing high-accuracy focus. The AF control circuit 325 outputs a distance to the subject 201 based on the amount of focus adjustment or the amount of movement of the focus lens. The focus control system is not limited to contrast AF and may be phase difference AF or other AF systems. The AF control circuit 325 is able to detect the amount of focus adjustment or the position of the focus lens and acquire a distance to the subject 201 based on the position of the focus lens.

The image capturing unit 311 includes a lens 312, a shutter 313, and an image sensor 314.

The lens 312 focuses an optical image of the subject 201 on the image sensor 314. The lens 312 includes a diaphragm that determines an aperture value for adjusting an exposure.

The image sensor 314 includes a charge accumulation-type solid-state image sensor, such as a CCD and a CMOS device, that converts an optical image to an electrical signal.

The shutter 313 exposes the image sensor 314 or shades the image sensor 314 with an opening and closing operation to control the shutter speed. The shutter 313 is not limited to a mechanical shutter and may be an electronic shutter. In an image capturing device using a CMOS sensor, an electronic shutter initially performs reset scanning for setting the amount of electric charge accumulated in pixels to zero for each pixel or for each region made up of a plurality of pixels (for example, for each line). After that, the image capturing unit 311 scans to read a signal after a lapse of a predetermined time for each pixel or each region made up of a plurality of pixels, on which reset scanning has been performed.

The zoom control circuit 315 controls the drive of a zoom lens included in the lens 312. The zoom control circuit 315 drives the zoom lens via a zoom motor (not shown) in accordance with an instruction from the system control circuit 319. Thus, resizing is performed.

The distance measurement system 316 segments a screen into predetermined blocks each made up of a plurality of pixels, and each block in the screen has the function of being able to detect a distance to the subject 201. In this way, the distance measurement system 316 is a unit that detects a distance to the subject 201. The distance measurement system 316 may detect a distance to the subject 201 based on the output of the AF control circuit 325. When there is a plurality of blocks in the screen, the distance measurement system 316 repeatedly operates AF block by block to detect a distance to the subject 201 in each block. In this case, the AF control circuit 325 is able to serve as the distance measurement system 316, so the distance measurement system 316 may be omitted.

A system that uses a time of flight (TOF) sensor may be used as an example of the distance measurement system 316. The TOF sensor is a sensor that measures a distance to an object based on a time difference (or phase difference) between the transmission timing of irradiation wave and the receiving timing of reflected wave that is the irradiation wave reflected from the object. In addition, for example, a PSD system that uses a position sensitive device (PSD) for a light receiving element may be used as the distance measurement system 316.

The image processing circuit 317 performs image processing on RAW image data output from the image sensor 314. The image processing circuit 317 performs various image processing on image data (RAW image data) output from the image capturing unit 311 or data of image signals stored in the internal memory 320 (described later). Image processing, for example, includes at least one of white balance adjustment, gamma correction, color interpolation, demosaicing, filtering, and resizing. The image processing circuit 317 performs compression processing in a standard, such as JPEG, on data of image signals captured by the image capturing unit 311.

The communication device 318 is a communication interface for the components in the image capturing apparatus 110 to communicate with an external apparatus, such as the image processing apparatus 120, via a wireless network (not shown). A specific example of the network is a network based on Wi-Fi (registered trademark) standard. Communication using Wi-Fi (registered trademark) may be implemented via a router. The communication device 318 may be implemented by a wired communication interface, such as a USB and a LAN.

The system control circuit 319 includes a central processing unit (CPU). The system control circuit 319 generally controls various units of the image capturing apparatus 110 in accordance with a program stored in the internal memory 320. The system control circuit 319 generally controls the AF control circuit 325, the image capturing unit 311, the zoom control circuit 315, the distance measurement system 316, the image processing circuit 317, and the like.

The internal memory 320 temporarily stores various pieces of setting information, such as information about an in-focus position at the time of image capturing, which is used in the operation of the image capturing apparatus 110, an image captured by the image capturing unit 311, or an image processed by the image processing circuit 317. The internal memory 320 may temporarily store image data received as a result of communication of the communication device 318 with the image processing apparatus 120, analyzed data, such as information about the size of the subject 201, or other data. The internal memory 320 is, for example, a rewritable nonvolatile memory, such as a flash memory and an SDRAM.

The external memory interface (I/F) 321 is an interface with a nonvolatile storage medium loadable to the image capturing apparatus 110 or a nonvolatile storage medium fixed inside the image capturing apparatus 110. The external memory I/F 321 is, for example, an SD card, a CF card, or the like. The external memory I/F 321 stores image data processed by the image processing circuit 317, image data or analyzed data received through communication of the communication device 318 with the image processing apparatus 120, or other data in a storage medium loadable to the image capturing apparatus 110. When image data is reproduced, the external memory I/F 321 is able to read image data stored in the storage medium loadable to the image capturing apparatus 110 and output the image data to the outside of the image capturing apparatus 110.

The display unit 322, for example, shows an image temporarily stored in the internal memory 320, an image and data stored in a storage medium via the external memory I/F 321, or a setting screen of the image capturing apparatus 110. The display unit 322 is, for example, a thin film transistor (TFT) liquid crystal display, an organic EL display, an electronic viewfinder (EVF), or the like. The display unit 322 is controlled to display by the system control circuit 319.

The operating member 323 includes, for example, a button, a switch, a key, a mode dial, or the like, provided for the image capturing apparatus 110. The image capturing apparatus 110 includes, for example, a touch panel, or the like, that is also used in the display unit 322. User's commands for, for example, mode setting, image capturing operation, such as release, and setting of reference values for a plurality of evaluation indexes of an affected area reach the system control circuit 319 by way of the operating member 323.

The AF control circuit 325, the image capturing unit 311, the zoom control circuit 315, the distance measurement system 316, and the image processing circuit 317 are connected to the common bus 324. The communication device 318, the system control circuit 319, the internal memory 320, the external memory I/F 321, the display unit 322, and the operating member 323 are also connected to the common bus 324. The common bus 324 is a signal line for sending or receiving signals to or from each block.

Figure 4:
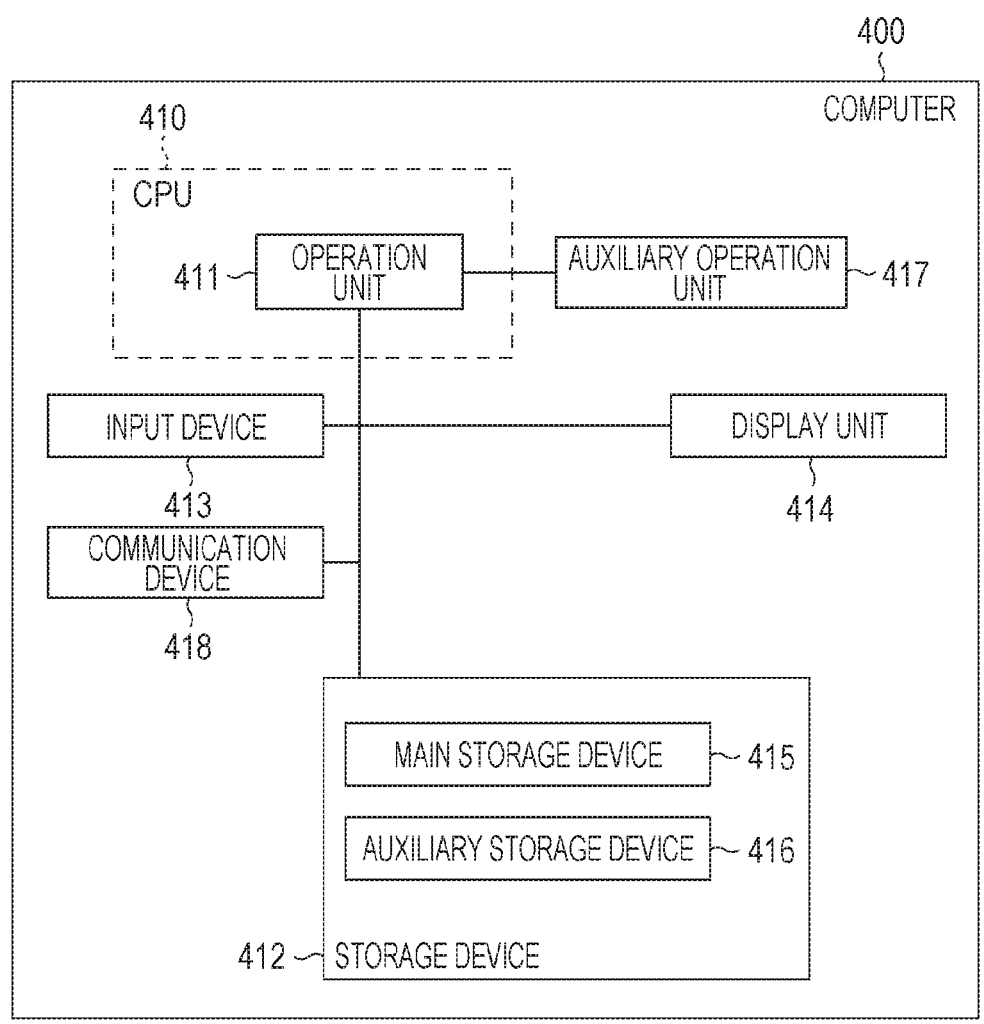
FIG. 4 is a diagram that shows the hardware configuration of an image processing apparatus.

Next, FIG. 4 shows the configuration of the computer 400 as an example of the hardware configuration of the image processing apparatus 120 of FIG. 1. The functions of the image processing apparatus 120 are implemented by using the computer 400. In FIG. 4, the computer 400 includes a CPU 410 that is a central processing unit, a storage device 412, an input device 413, a display unit 414, an auxiliary operation unit 417, and a communication device 418.

The CPU 410 includes an operation unit 411. The storage device 412 includes a main storage device 415 (such as a ROM or a RAM) and an auxiliary storage device 416 (such as a magnetic disk unit and a solid state drive (SSD)).

The input device 413 includes, for example, a mouse, a keyboard, and the like. The display unit 414 is, for example, a TFT liquid crystal display, an organic EL display, or another display.

The auxiliary operation unit 417 is an auxiliary operation IC that is used under control of the CPU 410. For example, a graphic processing unit (GPU) may be used as the auxiliary operation unit 417. A GPU is originally a processor for image processing; however, a GPU includes a plurality of product-sum operation units and is good at matrix calculation, so a GPU is often used as a processor that performs processing for signal learning. In a process of performing deep learning as well, a GPU is generally used. Alternatively, a field-programmable gate array (FPGA), an ASIC, or the like, may be used as the auxiliary operation unit 417.

The communication device 418 is a communication interface for the components in the image processing apparatus 120 to communicate with an external apparatus, such as the image capturing apparatus 110, via a wireless network.

The operation unit 411 of the CPU 410 runs a program stored in the storage device 412 to execute the functions.

The number of the CPUs 410 of the computer 400 or the number of the storage devices 412 of the computer 400 may be one or may be multiple. In other words, when at least one processing unit (CPU) and at least one storage device are connected and the at least one processing unit runs a program stored in the at least one storage device, the computer 400 functions as the above-described units. The processing unit is not limited to a CPU and may be an FPGA, an ASIC, or the like.

Figure 5:
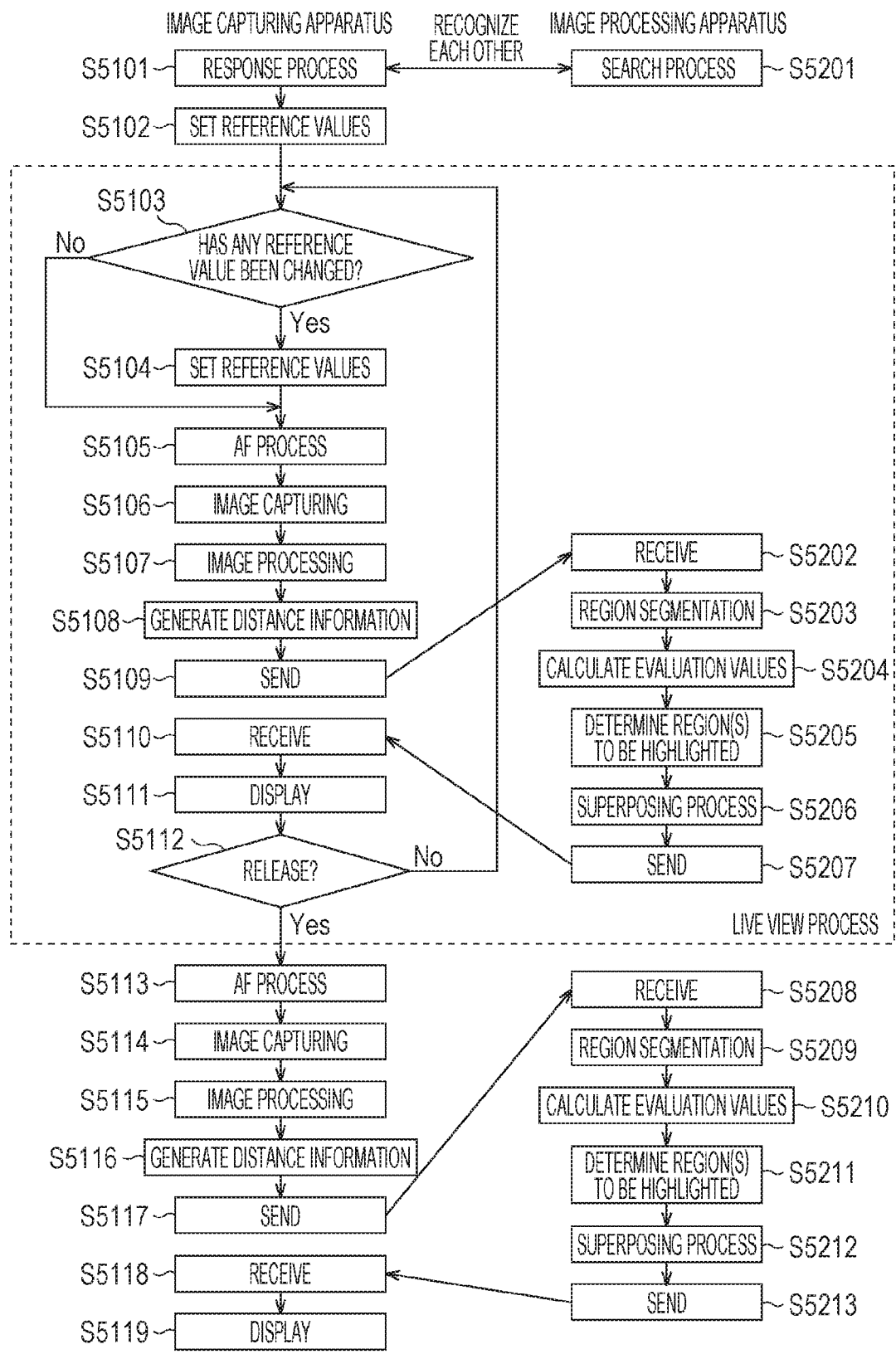
FIG. 5 is a flowchart that illustrates a first example of the operation of the image processing system.

Next, an example of the operation of the image processing system 100 of the present embodiment will be described with reference to the workflow chart shown in FIG. 5. In FIG. 5, step is abbreviated as S. For example, step S101 is shown as S5101. This also applies to FIG. 12 and FIG. 13 (described later). Steps having a step number whose third-digit character from the last is "1" (for example, S5101) indicate processes intended for the image capturing apparatus 110. Steps having a step number whose third-digit character from the last is "2" (for example, S5201) indicate processes intended for the image processing apparatus 120. These also apply to FIG. 12 and FIG. 13 (described later).

In response process of S5101 and search process of S5201, the image capturing apparatus 110 and the image processing apparatus 120 both connect with a network (not shown) of Wi-Fi standard that is a wireless LAN standard. In S5201, the image processing apparatus 120 executes the search process to search for the image capturing apparatus 110 to be connected to the image processing apparatus 120. In S5101, the image capturing apparatus 110 executes the response process to the search process of the image processing apparatus 120. A search for various image processing apparatuses 120 is performed by using, for example, a device search technology to make a search via the network. For example, universal plug and play (UPnP) is used as the device search technology. In UPnP, identification of each device is performed by universal unique identifier (UUID).

Figure 6:
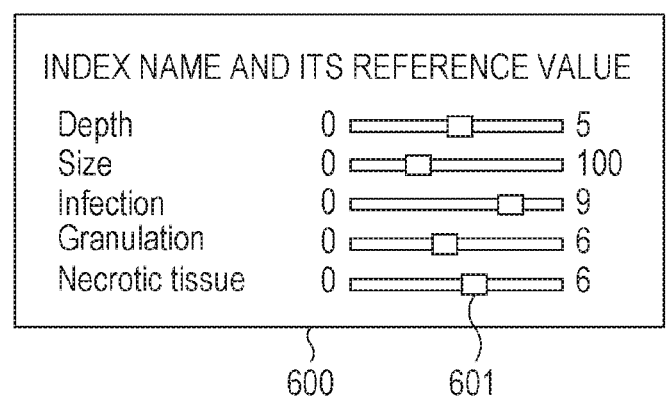
FIG. 6 is a view that shows a setting screen.

Subsequently, in S5102, the system control circuit 319 causes the display unit 322 to show the setting screen 600 shown in FIG. 6. A reference value is set for each evaluation index by a user moving a slider 601 associated with the evaluation index to the right or left side with the operating member 323. A left-end value of the slider 601 indicates a lower limit of a reference value, and a right-end value indicates an upper limit of the reference value. The system control circuit 319 sets a reference value for each evaluation index based on such details of operation on the slider 601 by a user. A graphical user interface (GUI) for setting a reference value is not limited to a slider and may be a knob, or the like. A user may select one or multiple evaluation indexes from among five evaluation indexes (depth, size, inflammation/infection, granulation, and necrotic tissue) whose evaluation values can be calculated. When part of the evaluation indexes are selected by a user, a reference value (s) is/are set for only the selected evaluation index(es). The number of evaluation indexes to be candidates that can be selected by a user is not limited to five.

Hereinafter, an example of a live view process will be described with reference to an image 700 shown in FIG. 7. The live view process is a process to show a live video image on the display unit 322 of the image capturing apparatus 110.

The live view process includes processes of S5103 to S5112 of the image capturing apparatus 110 and processes of S5202 to S5207 of the image processing apparatus 120. In FIG. 5, steps in which the live view process is executed are surrounded by the dashed line (this also applies to FIG. 12 and FIG. 13).

First, in S5103, the system control circuit 319 determines whether the user has changed the reference values for the evaluation indexes while the image 700 is on the screen. As shown in FIG. 7, sliders 701 similar to the sliders 601 shown in FIG. 6 are shown at the left lower part of the image 700. The user is allowed to change the reference values for the evaluation indexes by moving the sliders 701 to the right or left side at any timing during live view. A graphical user interface (GUI) for setting a reference value is not limited to a slider and may be a knob, or the like.

As a result of determination of S5103, when any reference value has been changed, the process proceeds to S5104. On the other hand, when no reference value has been changed, the process skips S5104 and proceeds to S5105.

In S5104, the system control circuit 319 sets the changed reference value(s) for the associated evaluation index(es) as a new reference value(s).

Subsequently, in S5105, the AF control circuit 325 executes AF process. In the AF process, the focus is automatically adjusted on the subject 201. The AF control circuit 325 segments the screen into a plurality of blocks and performs auto focusing (AF) in a predetermined block. In the present embodiment, it is assumed that the image capturing apparatus 110 is set such that the affected region 202 is placed at the center of the screen. Thus, the AF control circuit 325 performs AF in the block located at the center of the screen. The AF control circuit 325 outputs a distance to the AF area of the subject 201 based on the amount of focus adjustment or the amount of movement of the focus lens.

After that, in S5106, the image capturing unit 311 captures the image of the subject 201 such that the affected region 202 of the subject 201 is contained.

Then, in S5107, the image processing circuit 317 develops the image captured in S5106 and performs image compression on the developed image in a standard, such as JPEG. The developed image is also sent to the display unit 322 and is used in live view display. The image processing circuit 317 resizes the obtained image. The image generated in S5107 is sent by wireless communication to the image processing apparatus 120 in S5109 (described later).

As the size of the image to be sent to the image processing apparatus 120 increases, wireless communication takes more time. For this reason, the size of a resized image is selected in consideration of communication time that is allowed as the communication time between the image capturing apparatus 110 and the image processing apparatus 120. In addition, in S5203 (described later), a process to extract the affected region 202 from the image is executed. The image size depends on the duration of the extraction process and extraction precision. Therefore, the size of a resized image is selected also in consideration of these requirements. Since the process of S5107 is a process during live view process, if the duration of the process is long, the frame rate of live video image may decrease to deteriorate usability. For this reason, the image processing circuit 317 resizes an image in size equal to or less than the size that is obtained through image processing of S5115 (described later) that is not a process during live view process and that is a process in main image capturing. For example, in S5107, the image processing circuit 317 is able to resize an image such that the size is about 1.1 megabytes on the assumption of 8-bit RGB color in 720 pixel×540 pixel. The size of a resized image is not limited thereto.

Subsequently, in S5108, the system control circuit 319 generates distance information about a distance to the subject 201. Specifically, the system control circuit 319 generates distance information based on the distance to the AF area of the subject 201, obtained through the AF process of S5105. In S5105, the system control circuit 319 may acquire a distance to the subject 201 for each of the plurality of blocks into which the screen is segmented, based on the output of the distance measurement system 316.

After that, in S5109, the communication device 318 outputs the image data generated in S5107, the distance information generated in S5108, and the reference values for the evaluation indexes, set in S5102 or S5104, to the image processing apparatus 120.

In S5202, the CPU 410 acquires the image data output from the image capturing apparatus 110, the distance information associated with the subject 201 contained in the image data, and the reference values for the evaluation indexes via the communication device 418.

Then, in S5203, the CPU 410 uses the auxiliary operation unit 417 to extract or segment the affected regions 202 respectively for the evaluation indexes of the affected area of the subject 201 from the image data acquired in S5202. In the present embodiment, the CPU 410 extracts the affected region having an evaluation value greater than or equal to persistent redness (evaluation value 1) as the affected region for the evaluation index "Depth". The CPU 410 extracts the region of the affected area as the affected region for the evaluation index "Size". The CPU 410 extracts the affected region having an evaluation value greater than or equal to a sign of localized inflammation (evaluation value 1) as the affected region for the evaluation index "Inflammation/Infection". The CPU 410 extracts the region of good granulation as the affected region for the evaluation index "Granulation". The CPU 410 segments the region of a necrotic tissue as the affected region for the evaluation index "Necrotic tissue".

As region segmentation, for example, semantic region segmentation is performed by means of deep learning. In other words, a computer (not shown) for learning generates a trained model by causing a model of a neutral network to learn using images of a plurality of actual pressure ulcer affected areas whose affected regions for a plurality of evaluation indexes are known as training data. The image processing apparatus 120 estimates affected regions respectively for a plurality of evaluation indexes of a pressure ulcer from an input image based on the generated trained model. The number of trained models to be generated is not limited to one. For example, a different trained model may be generated for each evaluation index and an affected region for each evaluation index may be estimated based on those trained models. As an example of a model of neural network, a fully convolutional network (FCN) that is a segmentation model using deep learning may be applied. Deep learning inference is processed by the GPU included in the auxiliary operation unit 417 that is good at parallel execution of product-sum operations. An inference process may be executed by an FPGA, an ASIC, or the like. Region segmentation may be achieved by using another deep learning model. A segmentation method is not limited to deep learning. For example, graph cut, region growing, edge detection, governed segmentation, or the like, may be used.

Subsequently, in S5204, the CPU 410 calculates the evaluation values of the affected regions 202 extracted in S5203 respectively for the evaluation indexes of the affected area based on the result classified by deep learning. For the evaluation value of the evaluation index "Size", the CPU 410 calculates the area of the affected region 202 based on information about the angle of view or size of image data and the distance information generated in S5108 and calculates the evaluation value according to the area.

Figure 8:
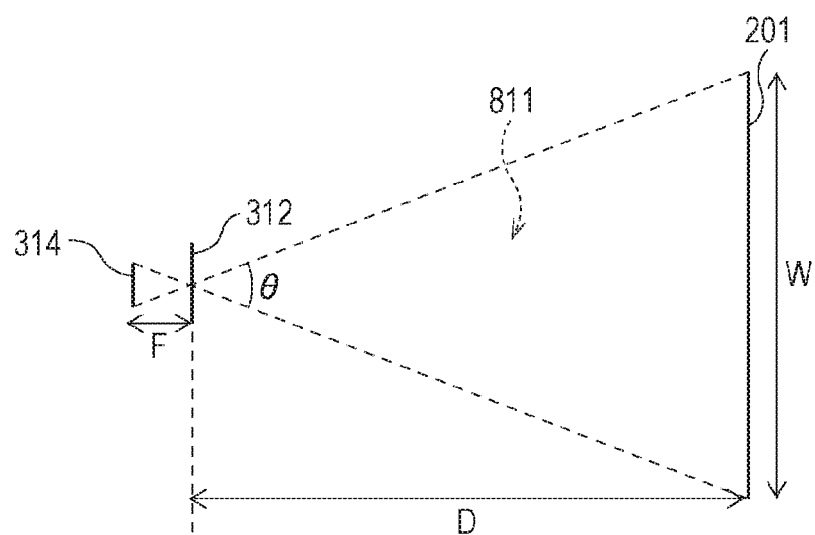
FIG. 8 is a view that illustrates a method of calculating the area of an affected region.

FIG. 8 is a view that illustrates an example of a method of calculating the area of an affected region 202. A general camera can be treated as a pinhole model shown in FIG. 8. Incident light 811 passes through the lens principal point of the lens 312 and is received by the imaging plane of the image sensor 314. The distance from the imaging plane to the lens principal point is a focal length F. When thin lens approximation is used, two principal points, that is, a front principal point and a rear principal point, can be regarded as coinciding with each other. It is apparent in a pinhole model that the lens 312 is a single lens having no thickness, but an actual lens may be made up of a plurality of lenses each having a thickness and including a focus lens or a zoom lens.

The image capturing apparatus 110 adjusts the focus on the subject 201 by adjusting the focus lens of the lens 312 such that an image is formed on the plane of the image sensor 314. The angle of view θ changes when the focal length F is changed with the zoom lens. At this time, the width W of the subject 201 on a focus plane is geometrically determined based on the relationship between the angle of view θ of the image capturing apparatus 110 and the subject distance D. The width W of the subject 201 is calculated by using a trigonometric function. In other words, the width W of the subject 201 is determined based on the relationship between the subject distance D and the angle of view θ using a focus position and a zoom amount as parameters. By dividing the value of the width W of the subject 201 by the number of pixels in a line of the image sensor 314, corresponding to the width W, the length on the focus plane, corresponding to one pixel on the image, is obtained.

The area is calculated as the product of the number of pixels of the affected region 202, obtained from the result of region segmentation in S5203, and the length on the focus plane, corresponding to one pixel on the image. A formula that is used to obtain the width W of the subject 201 or the length on the focus plane, corresponding to one pixel on the image, may be recurrently obtained from data of a subject whose width W is known, acquired by capturing the subject while changing the subject distance D. When the subject distance D is single, a subject should be assumed as a plane to correctly obtain an area. The CPU 410 may detect the inclination of the subject 201 in a depth direction and a change in the inclination in S5204 by using distance information at multiple positions on the screen, generated in S5108 and calculate the area of the affected region 202 based on the detected inclination and change.

The CPU 410 calculates the evaluation value of the evaluation index "Depth" based on the affected region having an evaluation value greater than or equal to persistent redness (evaluation value 1), extracted in S5204. In other words, the CPU 410 classifies the affected region 202 having an evaluation value greater than or equal to persistent redness (evaluation value 1) into any one of evaluation values 1, 2, 3, 4, and 5. For example, the CPU 410 uses the auxiliary operation unit 417 to perform classification by means of deep learning. In other words, a computer (not shown) for learning previously generates a trained model by causing a model of neural network to learn using images of a plurality of pressure ulcer affected areas whose evaluation values for depth are known as training data. The image processing apparatus 120 estimates the evaluation value for depth from the affected region having an evaluation value greater than or equal to persistent redness (evaluation value 1), based on the generated trained model. As an example of a model of neural network, a convolutional neural network (CNN) that is often used in image classification may be used. A method of classification is not limited to deep learning. For example, after a feature vector, such as a scale-invariant feature transform (SIFT) feature vector, is extracted from an image to be classified, the feature vector may be classified by using a discriminator, such as support vector machine (SVM).

The CPU 410 calculates the evaluation value of the evaluation index "Granulation" based on the region of good granulation, extracted in S5204, and the number of pixels of the affected region 202. As described in the chapter of the background art, the evaluation value of the evaluation index "Granulation" depends on the percentage of good granulation on a wound surface. Therefore, the CPU 410 calculates the percentage of the number of pixels of the region of granulation in the number of pixels of the affected region 202. The CPU 410 determines, based on the calculated percentage, which one of six stages described in the chapter of the background art the region of good granulation applies.

The CPU 410 calculates the evaluation value of the evaluation index "Necrotic tissue" based on the region of the necrotic tissue, extracted in S5204. In other words, the CPU 410 classifies the region of the necrotic tissue to any one of the evaluation values 3 and 6. For example, the CPU 410 uses the auxiliary operation unit 417 to perform classification by means of deep learning. In other words, a computer (not shown) for learning previously generates a trained model by causing a model of neural network to learn using images of a plurality of actual pressure ulcer affected areas whose evaluation values for necrotic tissue are known as training data. The image processing apparatus 120 estimates the evaluation value of the necrotic tissue from the region of the necrotic tissue based on the generated trained model. As an example of a model of neural network, a convolutional neural network (CNN) that is often used in image classification may be used. A classification method is not limited to deep learning. After a feature vector, such as a SIFT feature vector, is extracted from an image to be classified, the feature vector may be classified by using a discriminator, such as SVM.

Subsequently, in S5205, the CPU 410 determines the affected region(s) to be highlighted of the affected regions for the evaluation indexes, extracted in S5203, based on the reference values for the evaluation indexes and the evaluation values for the evaluation indexes. The reference values for the evaluation indexes are those acquired in S5202. The evaluation values for the evaluation indexes are those calculated in S5204. The CPU 410 makes a comparison between the reference value and the evaluation value for each evaluation index. When the evaluation value of the evaluation index is greater than or equal to the reference value associated with the evaluation index, the CPU 410 determines the affected region for the evaluation index as the affected region to be highlighted. A method of making a comparison between a reference value and an evaluation value is not limited to whether the evaluation value is greater than or equal to the reference value. For example, a comparison between a reference value and an evaluation value may be made by determining, for example, whether the evaluation value is less than or equal to the reference value or whether the evaluation value coincides with the reference value, depending on the details of the evaluation value.

Subsequently, in S5206, the CPU 410 superposes the following information on image data corresponding to the image data used at the time of extracting the affected regions 202 respectively for the evaluation indexes of the affected area, and displays the image data. In other words, the CPU 410 displays image data on which information indicating the extracted results of the affected regions 202 and information about the evaluation values and reference values of the affected regions 202 are superposed. At this time, the CPU 410 highlights the information indicating the extracted affected region(s) 202 determined as the region(s) to be highlighted in S5205. An example of a method of, when information indicating each extracted affected region and information about the evaluation value and reference value of each affected region are superposed, superposing and highlighting the information indicating the extracted region(s) determined by the CPU 410 will be described with reference to FIG. 7 and FIG. 9.

Figure 9:
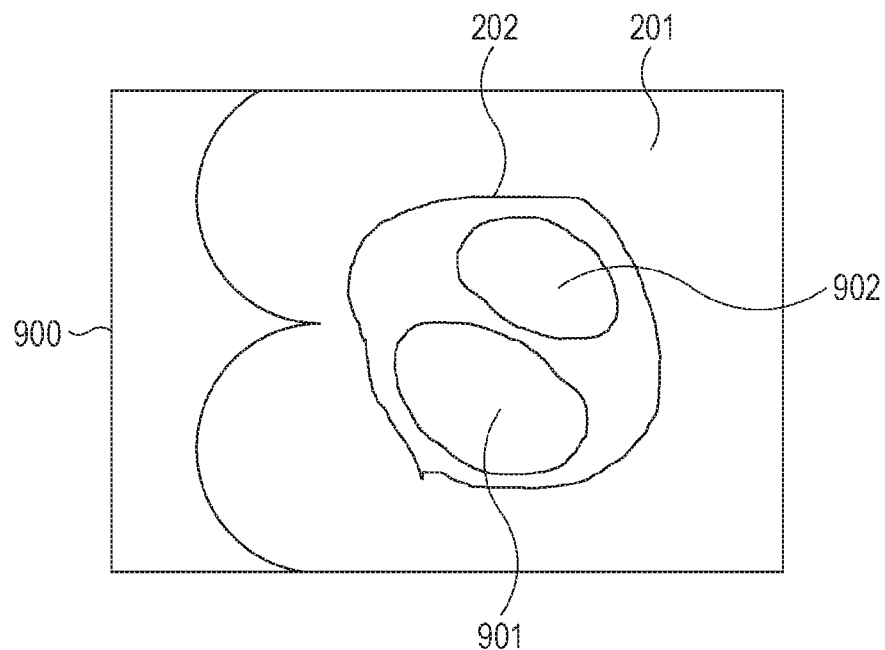
FIG. 9 is a view that shows images of affected regions before evaluated results of the affected regions are superposed.

In FIG. 9, an image 900 is an image before superposition. A subject 201, an affected region 202, a good granulation region 901, and a necrotic tissue region 902 are shown in the image 900. On the other hand, the image 700 shown in FIG. 7 is an image after superposition. Evaluation index names and the sliders 701 each indicating the reference value and evaluation value of the associated evaluation index are superposed on the image 900 at the left lower part of the image 700. A white rectangle in each slider 701 indicates the point at which the reference value lies. A black rectangle in each slider 701 indicates the point at which the evaluation value lies. In this way, each slider 701 changes its point indicating a value according to the value. The shape of the rectangle that indicates the point at which a value lies in each slider 701 may be modified into a circular shape or another shape. A color that indicates the point at which a value lies in each slider 701 is not limited to white or black. An image that indicates a reference value and an evaluation value is not limited to a slider and may be a knob, or the like.

Alternatively, only any one of a reference value and an evaluation value may be superposed. The evaluation index name(s) of a region(s) to be highlighted (region(s) whose evaluation value(s) is/are greater than or equal to an associated reference value(s) in the present embodiment), determined by the CPU 410, is/are superposed and highlighted in boldface. Thus, the evaluated result(s) of an evaluation index(es) whose evaluation value(s) exceed(s) an associated reference value(s) is/are displayed in a mode different from a mode in which the evaluated result(s) of the other evaluation index(es) is/are displayed.

Figure 7:
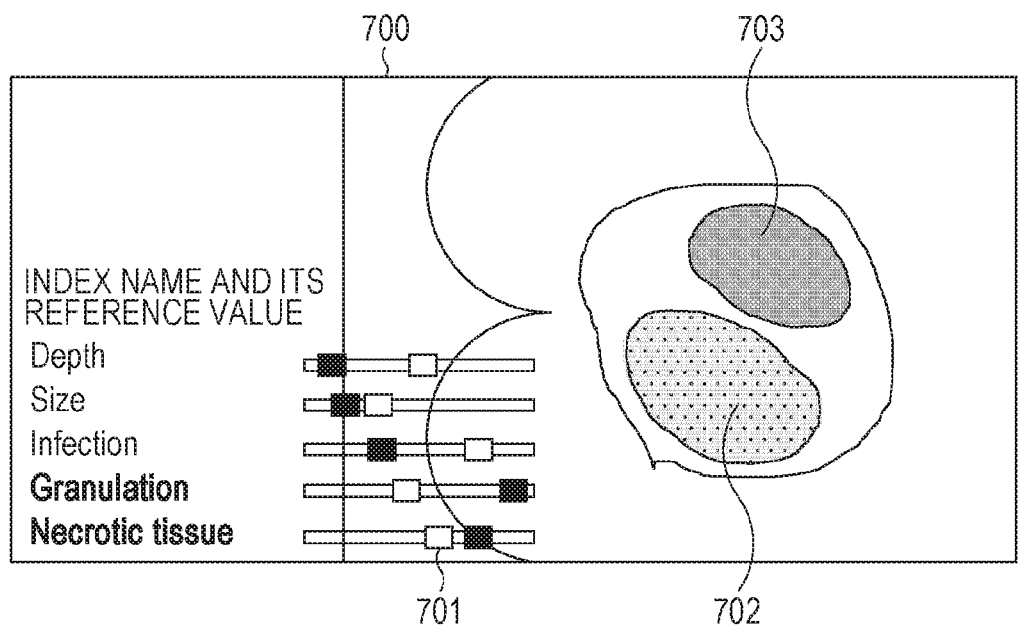
FIG. 7 is a view that shows an image obtained by superposing evaluated results of affected regions on images of the affected regions.

In the image 700 shown in FIG. 7, the case where the evaluation values of the evaluation indexes "Granulation" and "Necrotic tissue" exceed the associated reference values and the evaluation index names of those evaluation indexes are displayed in boldface is shown as an example. A method of highlighting an evaluation index name is not limited to boldface and may be, for example, a change of the color or size of an index name. In addition, the CPU 410 superposes the affected regions extracted for the evaluation indexes. At this time, information indicating the extracted affected region(s) determined to be highlighted by the CPU 410 is superposed and highlighted. As an example of a highlighting method, in the present embodiment, the affected regions other than the affected regions to be highlighted are not superposed, and only the affected regions to be highlighted are superposed.

In the image 700 shown in FIG. 7, the case where the granulation region 702 and the necrotic tissue region 703, whose evaluation values are greater than or equal to the associated reference values, are superposed and highlighted is shown as an example. The affected regions other than the affected regions to be highlighted may be superposed. In this case, a method of highlighting an affected region(s) to be highlighted may be such that an affected region(s) to be highlighted is/are highlighted by superposing only the affected region(s) to be highlighted with a changed color or transmittance to be superposed. In any mode, the granulation region 702 and the necrotic tissue region 703, whose evaluation values are greater than or equal to the associated reference values, are displayed in a mode different from a mode in which the other affected regions are displayed.

Back to the description of FIG. 5, in S5207, the communication device 418 outputs the following information to the image capturing apparatus 110. In other words, the communication device 418 outputs the information indicating the extracted affected regions 202 for the evaluation indexes of the affected area, extracted in S5203, to the image capturing apparatus 110. The communication device 418 outputs the information about the evaluation values of the affected regions 202, calculated in S5204, to the image capturing apparatus 110. The communication device 418 outputs the information about the affected region(s) 202 to be highlighted, determined in S5205, to the image capturing apparatus 110. In the present embodiment, the communication device 418 outputs the image 700, on which superposition is performed in S5206, to the image capturing apparatus 110 by wireless communication. The image 700 contains information about the comparison result between the reference value and the evaluation value for each of the evaluation indexes of the affected area (see the white rectangle and the black rectangle in each slider 701).

In S5110, the system control circuit 319 acquires the information about the extracted affected regions 202 for the evaluation indexes of the affected area from the image processing apparatus 120 via the communication device 318. In the present embodiment, the system control circuit 319 acquires the superposed image 700 output by the image processing apparatus 120 in S5207.

After that, in S5111, the system control circuit 319 shows the superposed image 700 received in S5110 on the display unit 322. In this way, the image capturing apparatus 110 superposes at least one of the information indicating the extracted affected regions 202 for the evaluation indexes of the affected area and the information about the evaluation values of the affected regions 202 on the live view image generated by the image capturing unit 311, and displays the superposed image. The live view image generated by the image capturing unit 311 is, for example, the image 900. By so doing, the user of the image capturing apparatus 110 is able to check whether the evaluation values of the affected regions 202 and the regions estimated as the affected regions 202 are valid before release and then perform main image capturing. When it is not necessary to check whether the regions estimated as the affected regions are valid before release, the processes of S5108 to S5111 in the image capturing apparatus 110 and the processes of S5202 to S5207 in the image processing apparatus 120 may be omitted.

The image processing apparatus 120 may execute the process of extracting affected regions in S5203 and calculating evaluation values in S5204 and may transmit the extracted affected regions and the evaluation values of the affected regions to the image capturing apparatus 110 without executing S5205 and S5206. In this case, the image capturing apparatus 110 determines an affected region(s) to be highlighted by comparing the acquired evaluation values of the affected regions with the associated reference values. The image capturing apparatus 110 generates an image in which the information indicating the extracted results are superposed on the affected region(s) to be highlighted. Thus, when the user has changed the reference values, the affected region(s) to be highlighted can be quickly changed by comparing the already acquired evaluation values of the affected regions with the associated changed reference values.

Subsequently, in S5112, the system control circuit 319 determines whether the release of the operating member 323 is depressed. As a result of this determination, when the release is not depressed, the process returns to the above-described S5103. On the other hand, when the release is depressed, the live view process is exited, and the process proceeds to S5113. The process before S5113 is the live view process; whereas the process after S5113 is the main image capturing process to finally measure evaluation values of the evaluation indexes of the affected area.

In S5113, the AF control circuit 325, as in the case of S5105, executes AF process to adjust the focus on the subject 201. The AF control circuit 325 outputs a distance to the subject 201 based on the amount of focus adjustment or the amount of movement of the focus lens.

Subsequently, in S5114, the image capturing unit 311, as in the case of S5106, captures the image of the subject 201 such that the affected region 202 of the subject 201 is contained.

After that, in S5115, the image processing circuit 317, as in the case of S5107, executes development process and resizing process. Since this step is a main image capturing process in contract to S5107 that is the live view process, the size of an image and the accuracy of measurement of the size are given a higher priority than processing time. Therefore, the image processing circuit 317 resizes the image to a size equal to or greater than the image generated in S5107. For example, in S5115, the image processing circuit 317 is able to resize the image such that the size is about 4.45 megabytes on the assumption of 4-bit RGB color in 1440 pixel×1080 pixel. The size of a resized image is not limited thereto.

Subsequently, in S5116, the system control circuit 319, as in the case of S5108, generates distance information about a distance to the subject 201.

After that, in S5117, the communication device 318, as in the case of S5109, outputs the image data generated in S5115 and the distance information about the distance to the subject 201, generated in S5116, to the image processing apparatus 120.

Then, in S5208, the CPU 410, as in the case of S5202, acquires the image data output from the image capturing apparatus 110 and the distance information associated with the subject 201 contained in the image data via the communication device 418.

Then, in S5209, the CPU 410, as in the case of S5203, uses the auxiliary operation unit 417 to extract or segment the affected regions 202 for the evaluation indexes of the affected area of the subject 201 from the image data acquired in S5208. The details of this process are described above, so the description thereof is omitted.

Subsequently, in S5210, the CPU 410, as in the case of S5204, calculates the evaluation values of the affected regions 202 for the evaluation indexes of the affected area, extracted in S5209. The details of this process are described above, so the description thereof is omitted.

Subsequently, in S5211, the CPU 410, as in the case of S5205, determines the affected region(s) to be highlighted of the affected regions for the evaluation indexes, extracted in S5209, based on the reference values for the evaluation indexes and the evaluation values for the evaluation indexes. The reference values for the evaluation indexes are those acquired in S5208. The evaluation values for the evaluation indexes are those calculated in S5210. The details of this process are described above, so the description thereof is omitted.

Subsequently, in S5212, the CPU 410, as in the case of S5206, superposes the following information on image data corresponding to the image data used at the time of extracting the affected regions 202 respectively for the evaluation indexes of the affected area, and displays the image data. In other words, the CPU 410 displays image data on which information indicating the extracted results of the affected regions 202 and information about the evaluation values and reference values of the affected regions 202 are superposed. At this time, the CPU 410 highlights the information indicating the extracted affected region(s) 202 determined as the region(s) to be highlighted in S5211. The details of this process are described above, so the description thereof is omitted. In S5212, the CPU 410 superposes an arrow icon 1001 at the right lower part of an image 1000 like the image 1000 shown in FIG. 10 in addition to the above image. The icon 1001 is used to operate to end display in S5119 (described later).

Figure 10:
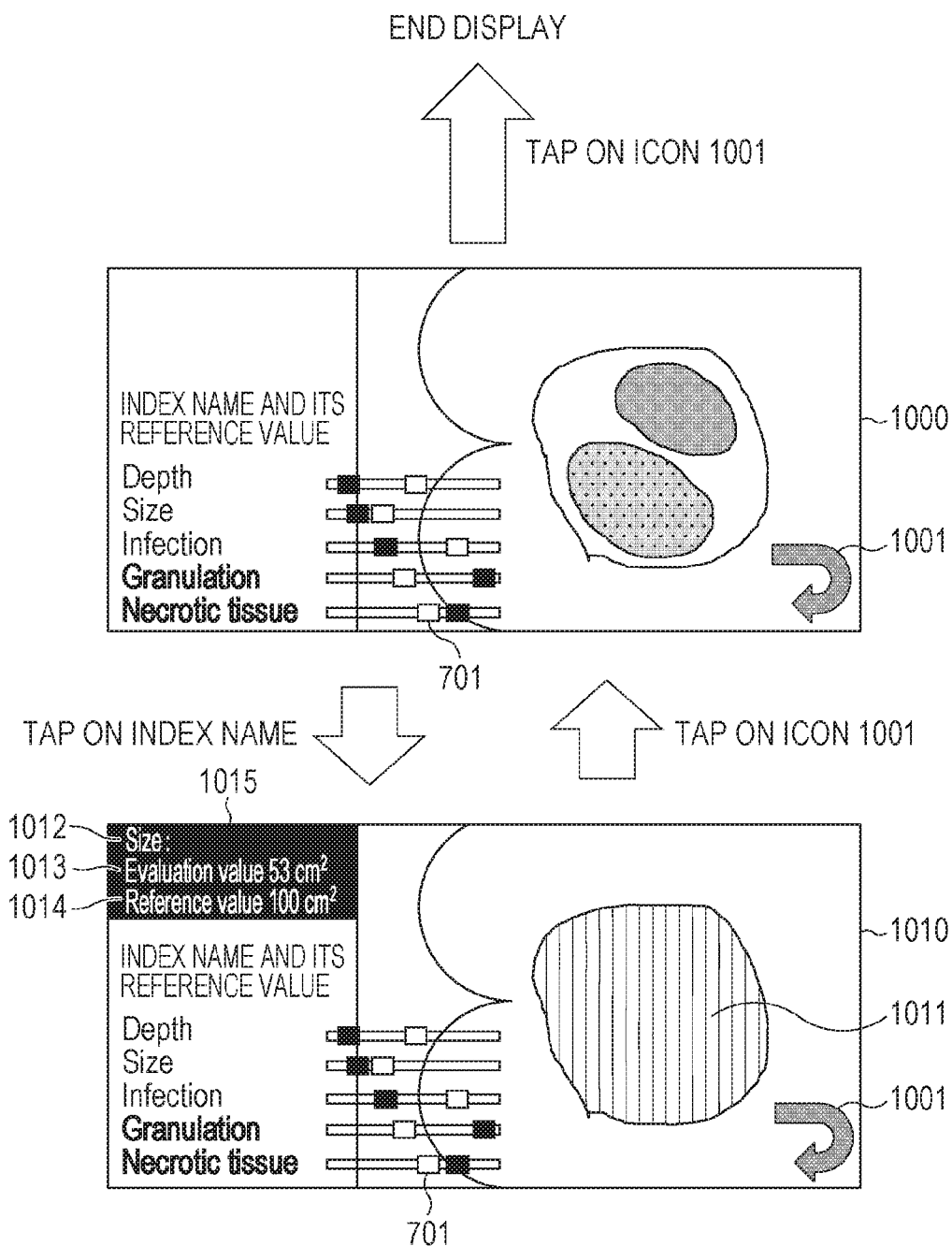
FIG. 10 is a view that shows a change of the images of affected regions on which evaluated results of the affected regions are superposed.

In addition to such the icon 1001, the CPU 410 generates an image in which, for each evaluation index, the extracted affected region 202 only for the evaluation index extracted in S5209 is superposed and the evaluation index name, the evaluation value, and the reference value are superposed at the left upper part. As an example of such an image, FIG. 10 shows an image 1010 in which the extracted result of the affected region 202 only for the evaluation index "Size" is superposed and the evaluation index name, the evaluation value, and the reference value are superposed at the left upper part. The CPU 410 superposes an extracted affected region 1011 extracted in S5209 as the affected region 202 for the evaluation index "Size" in the image 1010. The CPU 410 superposes a label 1015 containing an evaluation index name 1012, a character string 1013 indicating an evaluation value, and a character string 1014 indicating a reference value as information about the evaluation index "Size" in white characters in black background at the left upper part of the image 1010. The background color and character string color of the label 1015 are not limited to black and white as long as they are easily viewable. The user may be allowed to check the image of a portion where a label is overlapped, by a blending with a set transmittance. An image in which information for each evaluation index generated in this way is superposed can be referenced by the user through an operation on the screen in S5118 (described later).

Back to the description of FIG. 5, in S5213, the communication device 418, as in the case of S5207, outputs the following information to the image capturing apparatus 110. In other words, the communication device 418 outputs the information indicating the extracted affected regions 202 for the evaluation indexes of the affected area, extracted in S5209, to the image capturing apparatus 110. The communication device 418 outputs the information about the evaluation values of the affected regions 202, calculated in S5210, to the image capturing apparatus 110. The communication device 418 outputs the information about the affected region(s) 202 to be highlighted, determined in S5211, to the image capturing apparatus 110. In the present embodiment, the communication device 418 outputs the image 1000, on which superposition is performed in S5212 and the images in each of which the information about the evaluated result for the associated evaluation index is superposed, to the image capturing apparatus 110 by wireless communication. As described above, one of the images in each of which the information about the evaluation result for the associated evaluation index is superposed is the image 1010 for the evaluation index "Size".

Subsequently, in S5118, the system control circuit 319, as in the case of S5110, acquires the information about the extracted affected regions 202 for the evaluation indexes of the affected area from the image processing apparatus 120 via the communication device 318. In the present embodiment, the system control circuit 319 acquires the superposed images 1000, 1010 output by the image processing apparatus 120 in S5213.

Then, in S5119, the system control circuit 319, as in the case of S5111, shows the superposed image 1000 acquired in S5118 on the display unit 322. However, in S5119, different from S5111, the system control circuit 319 is able to change the screen shown on the display unit 322 by the user performing an operation using the operating member 323 while the image 1000 is on the screen.

In the present embodiment, it is assumed that the operating member 323 for changing a display screen is a touch panel display of the display unit 322. Therefore, the user changes the display screen by tapping on the screen of the display unit 322. The operating member for changing the display screen is not limited to the touch panel display and may be a button, or the like, provided for the image capturing apparatus 110.

An example of a method of changing the display screen will be described with reference to FIG. 10. As the process of S5119 starts, first, the image 1000 in which information about the evaluation indexes is superposed is displayed.

When the user taps on the arrow icon 1001 on the screen in which the image 1000 is displayed, the display unit 322 ends displaying the image 1000.

The user can tap on any evaluation index name displayed to the left side of each slider 701. Then, the system control circuit 319 causes the display unit 322 to display the image for the evaluation index associated with the tapped evaluation index name (for example, the image 1010 for the evaluation index "Size"). The information about the evaluated result for each evaluation index, generated in S5212, is superposed in this image. The user can tap on the arrow icon 1001 on the display screen that shows the image 1100 in which the information about the evaluation result for each evaluation index is superposed. Then, the system control circuit 319 causes the display unit 322 to display again the image 1000 in which the information about the evaluation indexes is superposed. The case where the slider 701 indicates an evaluation value and a reference value is shown for each of the (five) evaluation indexes in the image 1010 shown in FIG. 10 is described as an example. However, the configuration is not necessarily be like this. For example, in the image 1000, of all (five) evaluation indexes, only a slider that indicates an evaluation value and a reference value associated with only a tapped evaluation index name may be shown.

According to the above described embodiment, an image capturing apparatus 110 sets reference values for a plurality of evaluation indexes and captures images of affected regions 202 based on user's operation. An image processing apparatus 120 analyzes the captured images and determines the affected region(s) 220 for the evaluation index(es) exceeding the associated reference value(s) set by the user. The image capturing apparatus 110 causes a display unit 322 to highlight the affected region(s) 202 for the evaluation index(es) exceeding the associated reference value(s) and superposes and displays the affected region(s) on the image of the affected region. Therefore, a user (doctor) is able to, for example, at the time of progress evaluation of a pressure ulcer, make a contrast between a reference value and an evaluated result and easily understand the evaluation index(es) exceeding the associated reference value(s) and the affected region(s) 202 for the evaluation index(es) exceeding the associated reference value(s). Even when criteria for evaluation indexes vary among patients, the user (doctor) is able to easily and reliably understand the evaluation index(es) exceeding the associated reference value(s) and the affected region(s) 202 for the evaluation index(es) exceeding the associated reference value(s) by changing the setting of the reference values. Thus, the user (doctor) is able to select a further appropriate treatment strategy for an individual pressure ulcer.

In the present embodiment, DESIGN-R (registered trademark) is used as inputtable evaluation indexes of a pressure ulcer; however, the evaluation indexes are not limited thereto. Other evaluation indexes, such as Bates-Jensen Wound Assessment Tool (BWAT), Pressure Ulcer Scale for Healing (PUSH), and Pressure Sore Status Tool (PSST), may be used. In other words, in response to a situation that an extracted region of a pressure ulcer and information about the size of the extracted region are obtained, a user interface for inputting evaluation items in, for example, BWAT, PUSH, PSST, or the like, may be displayed.

Description is made by way of the example of the configuration that is intended to input evaluation values of evaluation items of a pressure ulcer in the present embodiment. However, as long as a visual evaluation item, an evaluation value of an evaluation item in another dermatosis is applicable. For example, there are Severity Scoring of Atopic Dermatitis (SCORAD) for atopic dermatitis, and Body Surface Area, Psoriasis Area and Severity Index (PASI) for psoriasis, and the like, for psora.

Second Embodiment

Next, a second embodiment will be described. In the first embodiment, the case where the system control circuit 319 of the image capturing apparatus 110 sets reference values respectively for a plurality of evaluation indexes of an affected area in response to user's operation is described as an example. In contrast to this, in the present embodiment, not the image capturing apparatus 110 but the image processing apparatus 120 sets reference values respectively for a plurality of evaluation indexes of an affected area. The storage device 412 of the image processing apparatus 120 includes a database that stores an evaluated result for each subject. At the time of capturing the subject stored before, the image processing apparatus 120 is able to set reference values based on the evaluation values by consulting the evaluated result at the time of the last image capturing. The database for storing an evaluated result for each subject may be implemented by a hardware apparatus different from the image capturing apparatus 110 or the image processing apparatus 120. As described above, the present embodiment differs from the first embodiment mainly in the configuration and process for setting reference values and the configuration and process for storing an evaluated result for each subject. Therefore, in the description of the present embodiment, like reference numerals assigned in FIG. 1 to FIG. 10 denote the corresponding portions of the first embodiment, and the detailed description thereof is omitted.

Figure 11:
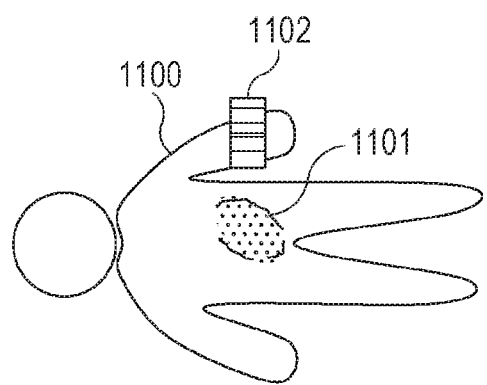
FIG. 11 is a diagram that shows a second example of a subject.

FIG. 11 is a diagram that shows an example of a subject to be measured by an image processing system of the present embodiment.

In the present embodiment, a barcode tag 1102 is attached to a subject 1100 having an affected region 1101 to be extracted as information to identify the subject 1100. With the barcode tag 1102, the image of an affected area and the ID of the subject 1100 can be associated with each other. A tag to identify a subject is not limited to a barcode tag and may be a two-dimensional code, such as a QR code (registered trademark), or a numeric value.

The display unit 414 of the image processing apparatus 120 displays an image captured by the image capturing unit 311 or displays based on at least one of information indicating an extracted affected region stored in the database of the storage device 412 and information about the size of the affected region. The display unit 414 superposes at least one of the information indicating the extracted affected region and the information about the size of the affected region on the image captured by the image capturing unit 311 and displays the superposed image. By operating the input device 413 of the computer 400 that serves as the hardware of the image processing apparatus 120, evaluated results of images captured in the past can be browsed.

In the present embodiment, the CPU 410 executes a process of reading a subject ID (the identification information of a subject) that identifies a subject 1100 from a one-dimensional barcode (not shown) of the barcode tag 1102 contained in the image. An object that the CPU 410 reads may be a two-dimensional code, such as a QR code (registered trademark), and a numeric value.

The CPU 410 checks the read subject ID against subject IDs entered in advance, and acquires the name of the subject 1100 as an example of identification information of a subject.

The CPU 410 consults a past record containing the read subject ID from the database of the storage device 412 and sets reference values for a plurality of evaluation indexes based on information contained in the record.

The CPU 410 generates a record based on an image, affected regions respectively for the evaluation indexes, information about evaluation values, the subject ID, the name, an image capture date and time, and the like. The CPU 410 executes storage control to enter the information of the generated record into the database of the storage device 412. The image is an image to be displayed by the display unit 414.

The process of reading a subject ID from the barcode tag 1102 and the process of acquiring the name of the subject 1100 by using the read subject ID may be executed by the image capturing apparatus 110. In this case, the communication device 318 of the image capturing apparatus 110 may output information for identifying the subject 1100 having the affected region 1101 to the image processing apparatus 120 together with distance information.

Figure 12:
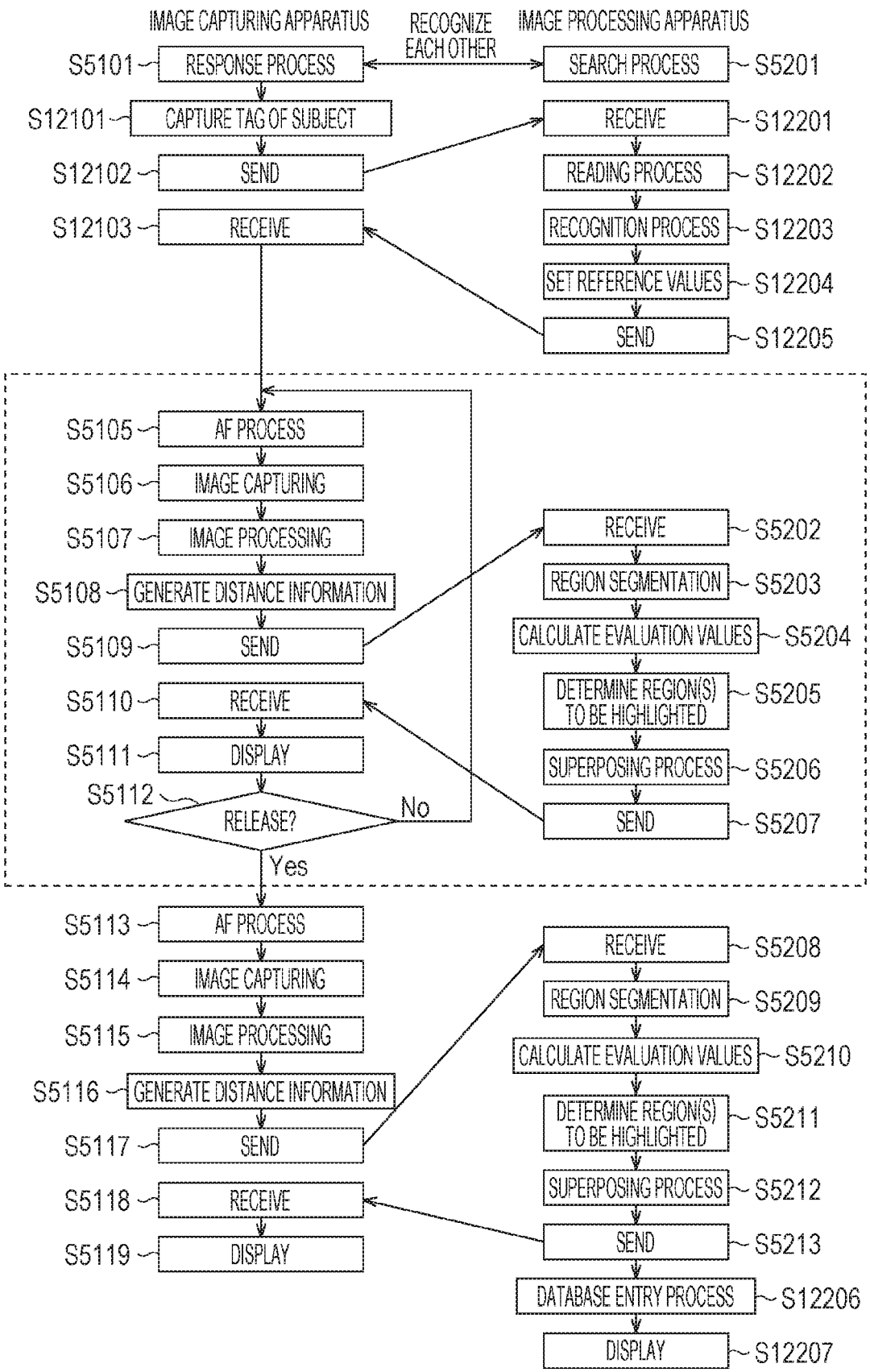
FIG. 12 is a flowchart that illustrates a second example of the operation of the image processing system.

Next, an example of the operation of the image processing system 100 of the present embodiment will be described with reference to the workflow chart shown in FIG. 12.

The workflow of the image capturing apparatus 110 of the present embodiment differs from the workflow of the image capturing apparatus 110 of the first embodiment shown in FIG. 5 in that the processes of S12101 to S12103 are added and the process of S5102 is deleted.

In S12101, the image capturing apparatus 110 captures a barcode tag 1102 attached to a subject 1100 before capturing an affected area of the subject 1100. When the subject 1100 is a patient, the barcode tag 1102 contains a patient ID to identify the patient as an example of the subject ID. By capturing an affected area just after capturing the barcode tag 1102, the sequence of captured images can be managed by image capture date and time, or the like. With this configuration, images from the image of a barcode tag 1102 to an image just before the image of the next barcode tag 1102 are identified by a subject ID as the images of the same subject 1100.

In S12102, the communication device 318 outputs the image containing the barcode tag 1102 obtained in S12101 to the image processing apparatus 120.

In S12103, the system control circuit 319 acquires notification of completion of setting of reference values that are output in S12205 (described later) via the communication device 318.

The workflow of the image processing apparatus 120 of the present embodiment differs from the workflow of the image processing apparatus 120 of the first embodiment in that S12201 to S12207 are added.

In S12201, the CPU 410 acquires the image containing the barcode tag 1102 output in S12102 via the communication device 418.

Subsequently, in S12202, the CPU 410 executes the process of reading the subject ID to identify the subject 1100 from the one-dimensional barcode (not shown) contained in the image acquired in S12201.

After that, in S12203, the CPU 410 checks the subject ID read in S12202 against IDs of subjects entered in advance and acquires the name of the subject 1100.

Then, in S12204, the CPU 410 consults a past record containing the subject ID read in S12202 and sets reference values for a plurality of evaluation indexes based on the information contained in the record. In the present embodiment, the CPU 410 consults a record at the last image capturing for the subject ID read in S12202 and acquires evaluation values for the evaluation indexes in the record. The CPU 410 sets the evaluation values for the evaluation indexes, acquired in this way, as reference values for the evaluation indexes. By setting the reference values in this way, progress evaluation of the affected area from the last image capturing can be performed. A record to be consulted is not limited to the one at the last image capturing and may be, for example, a record at the time of image capturing for the first time. A record containing a different subject ID may be consulted.

Subsequently, in S12205, the communication device 418 outputs notification of completion of setting of the reference values in the image processing apparatus 120 to the image capturing apparatus 110.

In S12206 after S5213, the CPU 410 executes database entry process. In the present embodiment, the CPU 410 associates the subject ID read in S12202 and the name of the subject 1100, acquired in S12203, with the image captured in S5114. For example, as described above, an affected area can be captured after capturing a barcode tag 1102, and the sequence of captured images can be managed by image capture date and time, or the like. In this case, images from the image of a barcode tag 1102 to an image just before the image of the next barcode tag 1102 can be treated as the image of the same subject 1100 that is recognized from the former barcode tag 1102. The CPU 410 associates the name of the subject 1100 and the subject ID with the images.

The CPU 410 generates a record based on the image of the subject 1100 (image containing the affected region 1101), information about the size of the affected region 1101 of the subject 1100, the subject ID, the name of the subject 1100, an image capture date and time, and the like. The CPU 410 enters information of the record into the database in the storage device 412 included in the image processing apparatus 120.

Subsequently, in S12207, the CPU 410 displays the image 1000, on which superposition is performed in S5212, on the display device 414. An example of a method of changing a displaying screen is similar to that of S5119.

As described above, according to the present embodiment, the image processing apparatus 120 recognizes a subject 1100 from a captured image of a barcode tag 1102 and enters information indicating an evaluated result of an affected region 1101 into the database in the storage device 412 for each subject 1100. Therefore, in the present embodiment, in addition to the benefits described in the first embodiment, the following benefits are obtained. First, an evaluated result of an affected region 1101 can be stored for each subject 1100. At the time of capturing a subject 1100, a past (for example, last) evaluated result stored before for the subject 1100 can be consulted, and reference values can be set based on the evaluation values. Thus, for example, only an affected region(s) 1101 for an evaluation index(es) having a greater evaluation value(s) than the associated last evaluation value(s) can be highlighted and displayed. Thus, the user is able to easily check an affected region(s) 1101 for an evaluation index(es) that has/have been exacerbated as compared to the last image capturing.

The image processing apparatus 120 is an image processing apparatus that is a stationary side and is constantly supplied with electric power since the image processing apparatus 120 saves and displays information, and is able to display information indicating an extracted result of an affected region and information about the size of the affected region. Thus, in comparison with the case where the image capturing apparatus 110 that is a portable device that may require battery replacement displays information, the possibility that a battery runs out decreases at the time of checking an analyzed result containing information about the size of a subject by displaying the analyzed result. The image processing apparatus 120 that is generally a stationary device has a larger storage capacity of the storage device than the image capturing apparatus 110 that is a portable device, so the image processing apparatus 120 is able to save a large amount of images.

Third Embodiment

Next, a third embodiment will be described. In the present embodiment, even when there is an overlapped region among affected regions 202 respectively for a plurality of evaluation indexes, extracted by the CPU 410, the CPU 410 displays the affected regions 202 such that the affected regions 202 can be visually distinguished from each other by a user. Like reference numerals to those assigned in FIG. 1 to FIG. 12 denote the same portions as those in the first and second embodiments, and the detailed description thereof is omitted.

Figure 13:
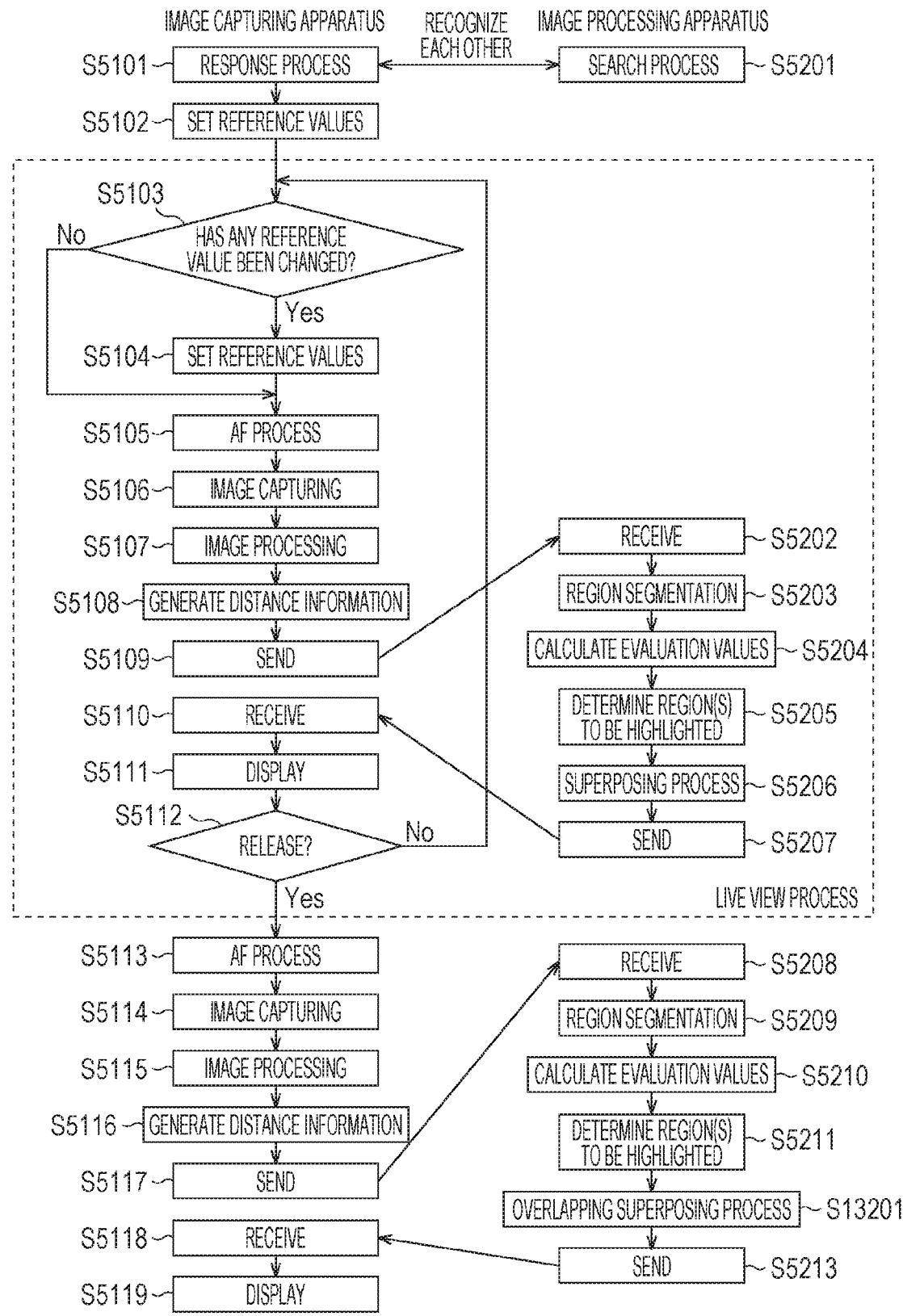
FIG. 13 is a flowchart that illustrates a fourth example of the operation of the image processing system.

Next, an example of the operation of the image processing system 100 of the present embodiment will be described with reference to the workflow chart shown in FIG. 13.

In the workflow of the image processing apparatus 120 of the present embodiment, S13201 is executed instead of S5212 in the first embodiment shown in FIG. 5.

In S13201, the CPU 410 initially performs overlapping superposition. An example of the details of the overlapping superposition will be described with reference to FIG. 14. In an image 1400, the CPU 410 superposes the following information on image data associated with image data used at the time of extracting regions respectively for a plurality of evaluation indexes of an affected area. In other words, information indicating the extracted affected regions 202 and information about the evaluation values and reference values of the affected regions 202 are superposed. At this time, information indicating the extracted affected region(s) 202 determined to be highlighted by the CPU 410 is highlighted and superposed. In the present embodiment, of the affected regions 202, only the affected region 202 determined to be highlighted by the CPU 410 is highlighted and superposed. In addition, the CPU 410 superposes the arrow icon 1001 at the right lower part of the image 1400. The CPU 410 superposes an icon 1401 containing a character string "Change View" at the left upper part of the image 1400. These icons 1001, 1401 are used to change the display screen in S5119.

In the image 1400, the evaluation values of the affected regions 202 for the evaluation indexes "Depth", "Size", "Granulation", and "Necrotic tissue" exceed the associated reference values. Therefore, these four affected regions 202 are superposed and displayed. There are overlapped regions among these four affected regions 202. For this reason, the user is not able to visually distinguish the boundaries of all the affected regions 202. In S13201, the CPU 410 generates an image in which the extracted affected regions 202 are superposed such that the user is able to visually distinguish the affected regions 202.

An example of a method of superposing extracted affected regions 202 such that the user is able to visually distinguish the affected regions 202 will be described with reference to FIG. 14.

An image 1410 is segmented into screens in the number of the affected regions 202 to be highlighted or more. In the example shown in FIG. 14, the image 1410 is segmented into four screens 1411 to 1414 in association with the four affected regions 202 to be highlighted. The screen 1411 is a screen for the evaluation index "Necrotic tissue". The screen 1412 is a screen for the evaluation index "Depth". The screen 1413 is a screen for the evaluation index "Granulation". The screen 1414 is a screen for the evaluation index "Size".

On each of the screens 1411 to 1414, an image in which only the affected region 202 of the evaluation index associated with the screen is superposed on image data associated with image data used at the time of extracting the affected regions 202 respectively for the evaluation indexes of the affected area is displayed. A label 1415 that indicates the evaluation index name of the superposed affected region 202 is superposed at the left upper part of each of the screens 1411 to 1414. A label 1416 that indicates an evaluation value and a reference value for the evaluation index of the superposed affected region 202 is superposed at the right upper part of each of the screens 1411 to 1414. The arrow icon 1001 is superposed at the right lower part of the image 1410. The icon 1001 is used to change the display screen in S5119. Both the images 1400, 1410 that are generated as described above are output to the image capturing apparatus 110 in S5213 and are displayed in S5119.

Figure 14:
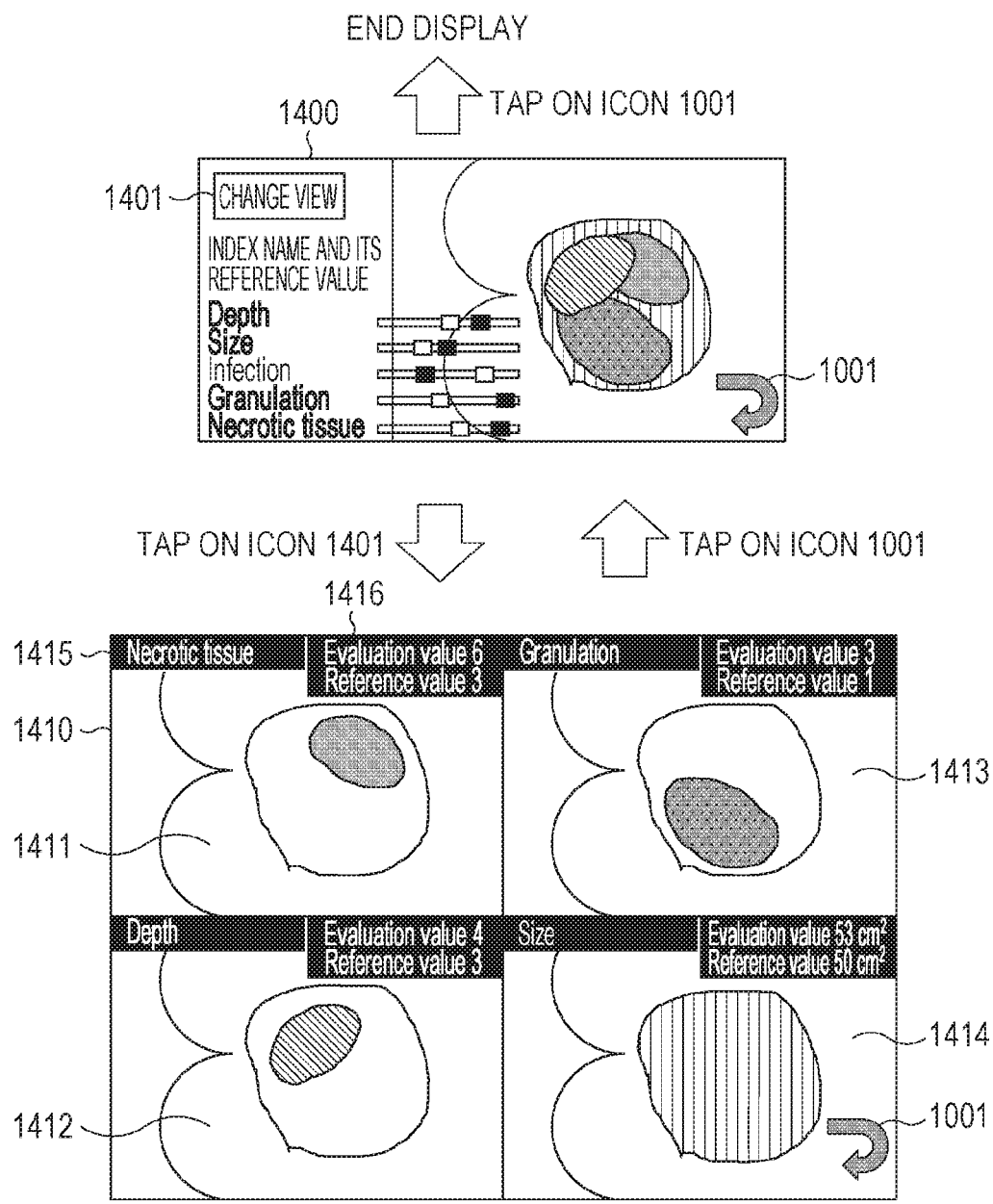
FIG. 14 is a view that shows a first example of images in which overlapping affected regions are separately displayed.

A method of superposing the affected regions 202 such that the user is able to visually distinguish the affected regions 202 is not limited to the method of generating, for example, the image 1410 of FIG. 14. The CPU 410 may superpose affected regions 202 like, for example, an image 1500 shown in FIG. 15 or an image 1600 shown in FIG. 16.

Figure 15:
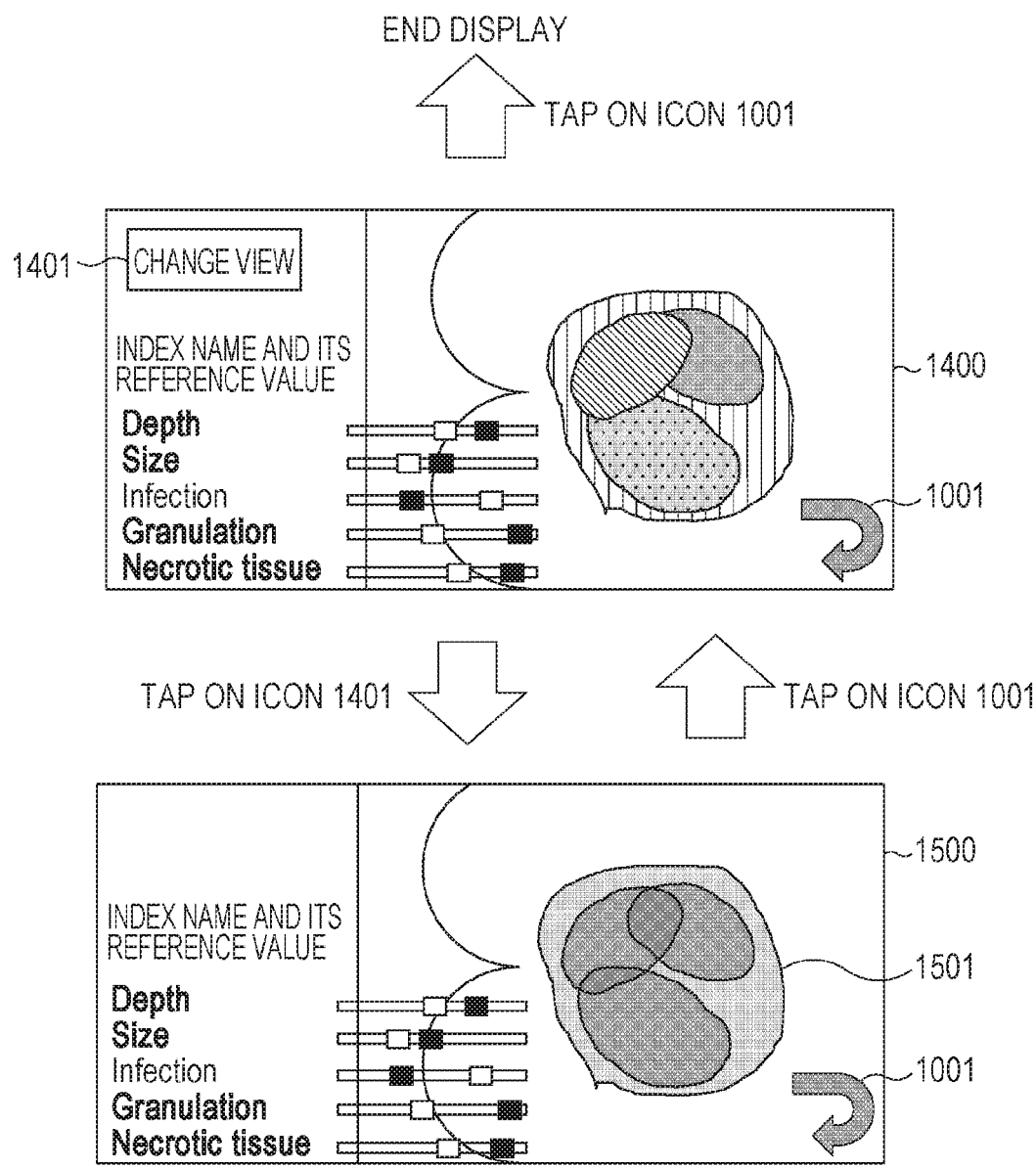
FIG. 15 is a view that shows a second example of images in which overlapping affected regions are separately displayed.

In the image 1500 shown in FIG. 15, an image 1501 is generated by performing α blending at an equal transmittance for superposed affected regions 202. Thus, the user is able to distinguish the affected regions 202 superposed on each other. The transmittance may be not equal among the affected regions 202. For example, a method of determining a transmittance for each evaluation index in advance, a method of reducing a transmittance of an evaluation index whose difference between an evaluation value and a reference value is small, or the like, may be employed.

Figure 16:
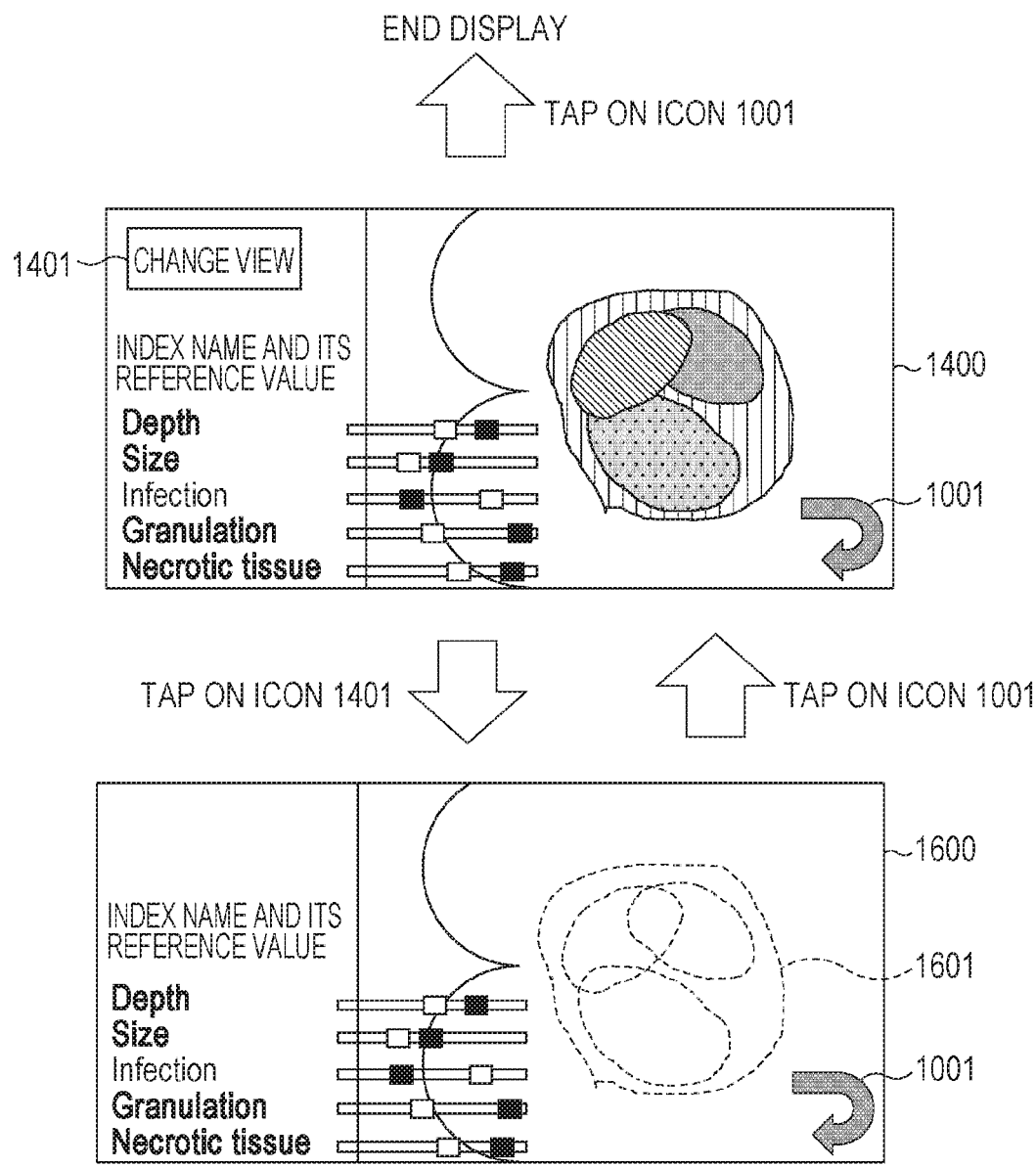
FIG. 16 is a view that shows a third example of images in which overlapping affected regions are separately displayed.

In the image 1600 shown in FIG. 16, an image 1601 is generated by performing superposition such that only the boundaries of the superposed affected regions 202 have a different line type for each evaluation index. Thus, the user is able to distinguish the affected regions 202 superposed on each other. The line type of a frame line is not limited to a dashed line and may be a solid line, a dotted line, a chain line, or the like. In S5119, the system control circuit 319 may cause the display unit 322 to sequentially display an image in which, of the affected regions 202, only an affected region 202 associated with one evaluation index is superposed, for each of the evaluation indexes at set time intervals. With this configuration as well, the user is able to visually distinguish the superposed affected regions 202.

In S5119, the system control circuit 319 switches between the image 1400 without consideration of overlapped regions, generated in S13201, and the image 1410 with consideration of overlapped regions based on user's operation on the icon 1001 or the icon 1401. Thus, the display screen changes. The image 1500, the image 1600, or the like, may be used instead of the image 1410 as the image with consideration of overlapped regions.

An example of a method of changing the display screen will be described with reference to FIG. 14. In the present embodiment, it is assumed that the operating member for changing a display screen is a touch panel display of the display unit 322. Therefore, the user changes the display screen by tapping on the screen of the display unit 322. The operating member for changing the display screen is not limited to the touch panel display and may be a button, or the like, provided for the image capturing apparatus 110.

As the process of S5119 starts, first, the image 1400 in which the affected regions 202 for the evaluation indexes are superposed is displayed. When the user taps on the arrow icon 1001 on the screen in which the image 1400 is displayed, displaying the image 1400 is ended.

When the user taps on the icon 1401 containing the character string "Change View", the system control circuit 319 causes the display unit 322 to display the image with consideration of overlapped regions (for example, the image 1410) generated in S13201. When the user taps on the arrow icon 1001 on the display screen that shows the image with consideration of overlapped regions, the system control circuit 319 causes the display unit 322 to display again the image 1400 without consideration of overlapped regions. FIG. 15 or FIG. 16 shows a scene of a change in the display screen in the case where the image 1500 or the image 1600 is used instead of the image 1410 as the image with consideration of overlapped regions, and only the image 1410 in FIG. 14 is replaced with the image 1500 or the image 1600. Thus, the detailed description of a change in the display screen in the case where the image 1500 or the image 1600 is used is omitted.

As described above, according to the present embodiment, affected regions 202 overlapped with each other are displayed as distinguished from each other. Therefore, in the present embodiment, in addition to the benefits described in the first embodiment, the following benefits are obtained. In other words, even when there is an overlapped region among affected regions 202 of a plurality of extracted evaluation indexes, a user is able to visually distinguish the regions from each other. Thus, the user can further easily check affected regions 202. The present embodiment may be applied to the second embodiment.

The above-described embodiment only illustrates a specific example in carrying out the disclosure, and the technical scope of the disclosure should not be interpreted restrictively. The aspect of the embodiments may be implemented in various forms without departing from the technical idea or main characteristics of the aspect of the embodiments. The aspect of the embodiments may be implemented in various forms without departing from the technical idea or main characteristics of the aspect of the embodiments.

For example, in the embodiments, two apparatuses, that is, the image capturing apparatus 110 and the image processing apparatus 120, make up the image processing system 100. Alternatively, three or more apparatuses may be communicably connected to one another and take in charge of assigned processes. Alternatively, all the processes similar to those in the above-described embodiments may be executed on a single image capturing apparatus or single tablet terminal.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-234569, filed Dec. 14, 2018, which is hereby incorporated by reference herein in its entirety.

What is claimed is:

1. A system comprising:
at least one processor;
at least one memory coupled to the at least processor storing instructions that, when executed by the at least one processor, cause the at least processor to function as:
an extracting unit configured to extract affected regions respectively for a plurality of evaluation indexes of an affected area from an image of a subject;
a calculating unit configured to calculate evaluation values associated with the plurality of evaluation indexes;
a selecting unit configured to, based on a result of comparison between the evaluation value of the affected regions extracted by the extracting unit respectively for the evaluation indexes and the reference value for the evaluation index, select the affected region for at least one of the evaluation indexes from among the affected regions respectively for the evaluation indexes; and
a display control unit configured to cause a display unit to display information about the selected affected region for the at least one of the evaluation indexes,
wherein the information about the selected affected region for the at least one of the evaluation indexes is displayed in a mode different from a mode in which information about the affected region for another of the evaluation indexes,
wherein the extracting unit extracts a region whose evaluation value associated with an evaluation index among the plurality of evaluation indexes is greater than or equal to a reference value set by a user, as the affected regions, wherein the selecting unit is configured to, based on a result of comparison between the evaluation value for the evaluation indexes and the reference value for the evaluation index, select at least one of the affected regions respectively for the evaluation indexes.

2. The system according to claim 1, wherein the information about the selected affected region for the at least one of the evaluation indexes is information to be superposed on the image of the subject.

3. The system according to claim 1, wherein the display control unit is configured to at least cause the display unit to display an image in which the selected affected region for the at least one of the evaluation indexes is highlighted and superposed on the image of the subject or an image in which information that indicates only the selected affected region for the at least one of the evaluation indexes is superposed on the image of the subject.

4. The system according to claim 1, wherein the display control unit is configured to cause the display unit to display information about the evaluated results of the affected regions respectively for the evaluation indexes.

5. The system according to claim 4, wherein the information about the evaluated result of the selected affected region for the at least one of the evaluation indexes is displayed in a mode different from a mode in which the information about the evaluated result of the affected region for the another of the evaluation indexes.

6. The system according to claim 1, wherein the display control unit is configured to cause the display unit to display information about the evaluated results of the affected regions respectively for the evaluation indexes, and
information about the evaluated results of the affected regions respectively for the evaluation indexes contains identification information of each of the evaluation indexes and information indicating at least one of the evaluation value and the reference value for each of the evaluation indexes.

7. The system according to claim 1, wherein the at least one processor further functions as: a setting unit configured to set the reference values based on user's operation, and
wherein the setting unit can change the reference value by operation of the user.

8. The system according to claim 1, wherein the at least one processor further functions as:
a storage control unit configure to cause a storage medium to store information indicating the evaluation values of the affected regions respectively for the evaluation indexes; and
a setting unit configured to, based on information indicating a past evaluation value of the affected region for at least one of the evaluation indexes, set the reference value for the at least one of the evaluation indexes.

9. The system according to claim 8, wherein the at least one processor further functions as:
a recognizing unit configured to recognize the subject contained in the image based on identification information of the subject, and
wherein
the storage control unit is configured to cause a storage medium to store information indicating the evaluation values of the affected regions respectively for the evaluation indexes in association with information about the subject having the affected regions based on a result recognized by the recognizing unit, and
the setting unit is configured to set the reference values for the evaluation values of the affected regions of the subject to be evaluated, respectively for the evaluation indexes based on information stored in the storage medium.

10. The system according to claim 1, wherein the display control unit is configured to, when the affected regions for a plurality of the evaluation indexes at least partially overlap each other, perform at least one of causing the display unit to display an image in which boundaries of the overlapped regions are distinguished, causing the display unit to sequentially display images of the subject, on each of which information indicating the affected region for any one of the plurality of the evaluation indexes is superposed, and causing the display unit to display images of the subject, on which information indicating the affected regions for the plurality of the evaluation indexes is superposed, in one display screen such that the images do not overlap.

11. The system according to claim 1, wherein the display control unit highlights a first affected region on the display unit selected by the user, among affected regions associated with the plurality of evaluation indexes.

12. An apparatus comprising:
at least one processor; and
at least one memory coupled to the at least processor storing instructions that, when executed by the at least one processor, cause the at least processor to function as:
an extracting unit configured to extract affected regions respectively for a plurality of evaluation indexes of an affected area from an image of a subject;
a selecting unit configured to, based on evaluated results of the extracted affected regions respectively for the evaluation indexes, select the affected region for at least one of the evaluation indexes from among the affected regions respectively for the evaluation indexes; and
an output unit configured to output, to an external apparatus, information about the selected affected region for the at least one of the evaluation indexes,
wherein the information about the selected affected region for the at least one of the evaluation indexes, is displayed in a mode different from a mode in which information about the affected region for another of the evaluation indexes, and
wherein the extracting unit extracts a region whose evaluation value associated with an evaluation index among the plurality of evaluation indexes is greater than or equal to a reference value set by a user, as the affected regions.

13. The apparatus according to claim 12, wherein the output unit is configured to output, to the external apparatus, information about the evaluated results of the affected regions respectively for the evaluation indexes.

14. The apparatus according to claim 12, wherein the output unit is configured to output, to the external apparatus, information about the evaluated results of the affected regions respectively for the evaluation indexes, and
information about the evaluated results of the affected regions respectively for the evaluation indexes contains identification information of each of the evaluation indexes and information indicating at least one of the evaluation value and the reference value for each of the evaluation indexes.

15. The apparatus according to claim 12, wherein the at least one processor further functions as:
   a storage control unit configure to cause a storage medium to store information indicating the evaluation values of the affected regions respectively for the evaluation indexes; and
   a setting unit configured to, based on information indicating a past evaluation value of the affected region for at least one of the evaluation indexes, set the reference value for the at least one of the evaluation indexes.

16. The apparatus according to claim 15, wherein the at least one processor further functions as:
   a recognizing unit configured to recognize the subject contained in the image based on identification information of the subject,
   wherein
   the storage control unit is configured to cause a storage medium to store information indicating the evaluation values of the affected regions respectively for the evaluation indexes in association with information about the subject having the affected regions based on a result recognized by the recognizing unit,
   the setting unit is configured to set the reference values for the evaluation values of the affected regions of the subject to be evaluated, respectively for the evaluation indexes based on information stored in the storage medium.

17. The apparatus according to claim 12, wherein the display control unit highlights a first affected region on the display unit selected by the user, among affected regions associated with the plurality of evaluation indexes.

18. An apparatus comprising:
   at least one processor; and
   at least one memory coupled to the at least processor storing instructions that, when executed by the at least one processor, cause the at least processor to function as:
   an output unit configured to output an image of a subject to an external apparatus;
   an acquiring unit configured to acquire, from the external apparatus, information about an affected region of the subject, contained in the image, for at least one of a plurality of evaluation indexes, selected by the external apparatus, from among affected regions respectively for the evaluation indexes of an affected area;
   a selecting unit is configured to, based on a result of comparison between an evaluation value for the evaluation indexes and a reference value for an evaluation index, select at least one of the affected regions respectively for the evaluation indexes;
   a calculating unit configured to calculate evaluation values associated with the plurality of evaluation indexes; and
   a display control unit configured to cause a display unit to display based on the information acquired by the acquiring unit, wherein
   the selected information about the affected region for the at least one of the evaluation indexes is displayed in a mode different from a mode in which the information about the affected region for another of the evaluation indexes is displayed, and
   wherein the affected region is a region whose evaluation value associated with an evaluation index among the plurality of evaluation indexes is greater than or equal to a reference value set by a user.

19. The apparatus according to claim 18, wherein
   the selected information about the affected region for the at least one of the evaluation indexes is information to be superposed on the image of the subject.

20. The apparatus according to claim 19, wherein
   information about an evaluated result of the affected region for the at least one of the evaluation indexes is displayed in a mode different from a mode in which information about an evaluated result of the affected region for the other of the evaluation indexes is displayed.

21. The apparatus according to claim 20, wherein
   the display control unit is configured to, when the affected regions for a plurality of the evaluation indexes at least partially overlap each other, perform at least one of causing the display unit to display an image in which boundaries of the overlapped regions are distinguished, causing the display unit to sequentially display images of the subject, on each of which information indicating the affected region for any one of the plurality of the evaluation indexes is superposed, and causing the display unit to display images of the subject, on which information indicating the affected regions for the plurality of the evaluation indexes is superposed, in one display screen such that the images do not overlap.

22. The apparatus according to claim 18, wherein the display control unit highlights a first affected region on the display unit selected by the user, among affected regions associated with the plurality of evaluation indexes.

23. An apparatus comprising:
   at least one processor; and
   at least one memory coupled to the at least processor storing instructions that, when executed by the at least one processor, cause the at least processor to function as:
   an output unit configured to output an image of a subject to an external apparatus;
   a selecting unit configured to acquire, from the external apparatus, information about affected regions of the subject contained in the image respectively for a plurality of evaluation indexes of an affected area and, based on a result of comparison between an evaluation value for the evaluation indexes and a reference value for an evaluation index, select the affected region for at least one of the evaluation indexes from among the affected regions respectively for the evaluation indexes;
   a calculating unit configured to calculate evaluation values associated with the plurality of evaluation indexes; and
   a display control unit configured to cause a display unit to display based on the information about the affected region for the at least one of the evaluation indexes, selected by the selecting unit,
   wherein the selected information about the affected region for the at least one of the evaluation indexes is displayed in a mode different from a mode in which the information about the affected region for another of the evaluation indexes is displayed, and
   wherein the affected region is a region whose evaluation value associated with an evaluation index among the plurality of evaluation indexes is greater than or equal to a reference value set by a user.

24. The apparatus according to claim 23, wherein
the selected information about the affected region for the at least one of the evaluation indexes is information to be superposed on the image of the subject.

25. The apparatus according to claim 24, wherein
information about an evaluated result of the affected region for the at least one of the evaluation indexes is displayed in a mode different from a mode in which information about an evaluated result of the affected region for the other of the evaluation indexes is displayed.

26. The apparatus according to claim 23, wherein
the display control unit is configured to, when the affected regions for a plurality of the evaluation indexes at least partially overlap each other, perform at least one of causing the display unit to display an image in which boundaries of the overlapped regions are distinguished, causing the display unit to sequentially display images of the subject, on each of which information indicating the affected region for any one of the plurality of the evaluation indexes is superposed, and causing the display unit to display images of the subject, on which information indicating the affected regions for the plurality of the evaluation indexes is superposed, in one display screen such that the images do not overlap.

27. A method comprising:
extracting a region whose evaluation value associated with an evaluation index of a plurality of evaluation indexes is greater than or equal to a reference value set by a user, as affected regions respectively for the plurality of evaluation indexes of an affected area from an image of a subject;
calculating evaluation values associated with the plurality of evaluation indexes;
based on a result of comparison between the evaluation value of the affected regions extracted by the extracting unit respectively for the evaluation indexes and the reference value for the evaluation index, selecting the affected region for at least one of the evaluation indexes from among the affected regions respectively for the evaluation indexes; and
displaying information about the affected region for the selected at least one of the evaluation indexes in a mode different from a mode in which information about the affected region for another of the evaluation indexes is displayed.

28. A non-transitory computer-readable storage medium storing a program for causing a processor to execute a method, the method comprising:
extracting a region whose evaluation value associated with an evaluation index of a plurality of evaluation indexes is greater than or equal to a reference value set by a user, as affected regions respectively for the plurality of evaluation indexes of an affected area from an image of a subject;
calculating evaluation values associated with the plurality of evaluation indexes;
based on a result of comparison between the evaluation value of the affected regions extracted by the extracting unit respectively for the evaluation indexes and the reference value for the evaluation index, selecting the affected region for at least one of the evaluation indexes from among the affected regions respectively for the evaluation indexes; and
displaying information about the affected region for the selected at least one of the evaluation indexes in a mode different from a mode in which information about the affected region for another of the evaluation indexes is displayed.

* * * * *